US011820042B2

(12) United States Patent
Terada

(10) Patent No.: US 11,820,042 B2
(45) Date of Patent: Nov. 21, 2023

(54) PROCESSING APPARATUS

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 713 days.

(21) Appl. No.: 17/063,029

(22) Filed: Oct. 5, 2020

(65) Prior Publication Data

US 2021/0107180 A1    Apr. 15, 2021

(30) Foreign Application Priority Data

Oct. 10, 2019  (JP) .................................. 2019-187105

(51) Int. Cl.
  *B28D 5/02*  (2006.01)
  *B28D 5/00*  (2006.01)
(52) U.S. Cl.
  CPC ........... *B28D 5/023* (2013.01); *B28D 5/0064* (2013.01); *B28D 5/024* (2013.01)
(58) Field of Classification Search
  CPC .......... B28D 5/00; B28D 5/022; B28D 5/023; H01L 21/00; H01L 21/77; H01L 21/78
  See application file for complete search history.

(56) References Cited

U.S. PATENT DOCUMENTS

| | | | |
|---|---|---|---|
| 9,636,844 B2 * | 5/2017 | Wakita ...................... | B27B 5/30 |
| 10,847,398 B2 * | 11/2020 | Sekiya .................... | H01L 21/68 |
| 11,521,867 B2 * | 12/2022 | Hanajima ............ | B28D 5/0076 |
| 2016/0346956 A1 * | 12/2016 | Takekawa .......... | B23Q 17/0961 |
| 2019/0198379 A1 * | 6/2019 | Sekiya ............. | H01L 21/68728 |
| 2019/0283195 A1 * | 9/2019 | Terada .................. | H01L 21/304 |
| 2020/0398452 A1 * | 12/2020 | Terada .................. | B28D 5/022 |
| 2021/0074559 A1 * | 3/2021 | Jang .................. | H01L 21/67092 |

FOREIGN PATENT DOCUMENTS

JP           2016144838 A         8/2016

* cited by examiner

*Primary Examiner* — Adam J Eiseman
*Assistant Examiner* — Richard D Crosby, Jr.
(74) *Attorney, Agent, or Firm* — Greer Burns & Crain Ltd.

(57) ABSTRACT

A processing apparatus includes a holding table for holding a workpiece, a cutting unit including a spindle and a mount, a blade changer unit for mounting a cutting blade on or dismounting a cutting blade from the mount, and a control unit. The blade changer unit includes a blade chuck for holding the cutting blade and a moving unit. The cutting unit includes a vibration detecting sensor. The control unit includes a calculator for calculating the central axis of the mount from a position where the vibration detecting sensor detects vibrations caused upon contact between the mount and the blade chuck, and a mounting/dismounting controller for aligning the central axis of the blade chuck with the central axis of the mount and mounting the cutting blade on and dismounting cutting blade from the mount.

10 Claims, 23 Drawing Sheets

PROCESSING APPARATUS

BACKGROUND OF THE INVENTION

Field of the Invention

The present invention relates to a processing apparatus having a blade changer unit.

Description of the Related Art

Cutting apparatuses as processing apparatuses are required to position the center of a cutting blade mount and the center of a holder of a blade changer unit that holds a cutting blade in alignment with each other in order to mount and dismount the cutting blade properly (see, for example, JP2016-144838A).

SUMMARY OF THE INVENTION

However, even after the cutting apparatus disclosed in JP2016-144838A has carried out the above positional alignment, the center of the cutting blade mount and the center of the holder in the blade changer unit may become positionally misaligned due to the effects of heat, collisions between parts, etc. In the event of such a positional misalignment, the center of the cutting blade mount and the center of the holder have to be adjusted again into alignment with each other.

However, the blade changer unit of the cutting apparatus disclosed in JP2016-144838A requires the operator to perform a tedious and time-consuming step involving visual and tactile senses in order to determine the position of the center of the mount.

It is therefore an object of the present invention to provide a processing apparatus that is capable of easily determining the position of a mount for mounting a cutting blade thereon.

In accordance with an aspect of the present invention, there is provided a processing apparatus including a holding table for holding a workpiece thereon, the holding table being processing-feedable in an X-axis direction relatively to a spindle, a cutting unit including the spindle and a mount fixed to a distal end of the spindle and having a boss extending in a Y-axis direction perpendicular to the X-axis direction, a blade changer unit for mounting a cutting blade on the boss of the mount and dismounting a cutting blade from the boss of the mount, and a controller for controlling the cutting unit and the blade changer unit, in which the mount further includes a bearing flange for supporting the cutting blade, the bearing flange projecting radially from an axial rear end of the boss, the blade changer unit includes a holder for holding the cutting blade, and a moving unit for moving the holder, one or both of the cutting unit and the blade changer unit have a vibration detecting sensor for detecting vibrations, and the controller includes a calculator for moving the boss or the bearing flange and the holder relatively to each other in the X-axis direction and a Z-axis direction perpendicular to the X-axis direction and the Y-axis direction to bring the boss or the bearing flange and the holder into contact with each other at at least three contact points, and calculating the center of the mount from an X coordinate and a Z coordinate where the vibration detecting sensor detects vibrations caused upon the contact between the boss or the bearing flange and the holder, and a mounting/dismounting controller for aligning the center of the holder with the center of the mount calculated by the calculator and mounting the cutting blade on the boss or dismounting the cutting blade from the boss.

In accordance with another aspect of the present invention, there is provided a processing apparatus including a holding table for holding a workpiece thereon, the holding table being processing-feedable in an X-axis direction relatively to a spindle, a cutting unit including the spindle and a mount fixed to a distal end of the spindle and having a boss extending in a Y-axis direction perpendicular to the X-axis direction, a blade changer unit for mounting a cutting blade on the boss of the mount and dismounting a cutting blade from the boss of the mount, and a controller for controlling the cutting unit and the blade changer unit, in which the mount further includes a bearing flange for supporting the cutting blade, the bearing flange projecting radially from an axial rear end of the boss, the blade changer unit includes a holder for holding a jig having an opening defined therein that is larger than the boss, and a moving unit for moving the holder, one or both of the cutting unit and the blade changer unit have a vibration detecting sensor for detecting vibrations, and the controller includes a calculator for moving the boss or the bearing flange and the jig relatively to each other in the X-axis direction and a Z-axis direction perpendicular to the X-axis direction and the Y-axis direction to bring the boss or the bearing flange and the jig into contact with each other at at least three contact points, and calculating the center of the mount from an X coordinate and a Z coordinate where the vibration detecting sensor detects vibrations caused upon the contact between the boss or the bearing flange and the jig, and a mounting/dismounting controller for aligning the center of the holder with the center of the mount calculated by the calculator and mounting the cutting blade on the boss or dismounting the cutting blade from the boss.

Preferably, in the processing apparatus, the jig includes the cutting blade.

Preferably, in the processing apparatus, the spindle has a central axis whose direction is represented by the Y-axis direction, the controller brings the holder into contact with the boss or a distal end of the bearing flange, the calculator calculates a coordinate in the Y-axis direction of the boss from a Y coordinate where the vibration detecting sensor detects vibrations, and the mounting/dismounting controller mounts the cutting blade on the boss or dismounts the cutting blade from the boss while in alignment with the coordinate in the Y-axis direction of the boss that is calculated by the calculator.

Preferably, in the processing apparatus, the spindle has a central axis whose direction is represented by the Y-axis direction, the controller brings the jig into contact with the boss or a distal end of the bearing flange, the calculator calculates a coordinate in the Y-axis direction of the boss from a Y coordinate where the vibration detecting sensor detects vibrations, and the mounting/dismounting controller mounts the cutting blade on the boss or dismounts the cutting blade from the boss while in alignment with the coordinate in the Y-axis direction of the boss that is calculated by the calculator.

Preferably, in the processing apparatus, the vibration detecting sensor includes either an AE (acoustic emission) sensor or an acceleration sensor.

The processing apparatus according to the aspect of the present invention and the processing apparatus according to the other aspect of the present invention are advantageous in that they are able to determine with ease the position of the mount on which a cutting blade is mounted.

The above and other objects, features and advantages of the present invention and the manner of realizing them will become more apparent, and the invention itself will best be understood from a study of the following description and appended claims with reference to the attached drawings showing preferred embodiments of the invention.

DETAILED DESCRIPTION OF THE PREFERRED EMBODIMENTS

Preferred embodiments of the present invention will hereinafter be described in detail below with reference to the drawings. The present invention is not limited to the details of the embodiments described below. The components described below cover those which could easily be envisaged by those skilled in the art and those which are essentially identical to those described above. Furthermore, the arrangements described below can be used in appropriate combinations. Various omissions, replacements, or changes of the arrangements may be made without departing from the scope of the present invention.

First Embodiment

Figure 1:
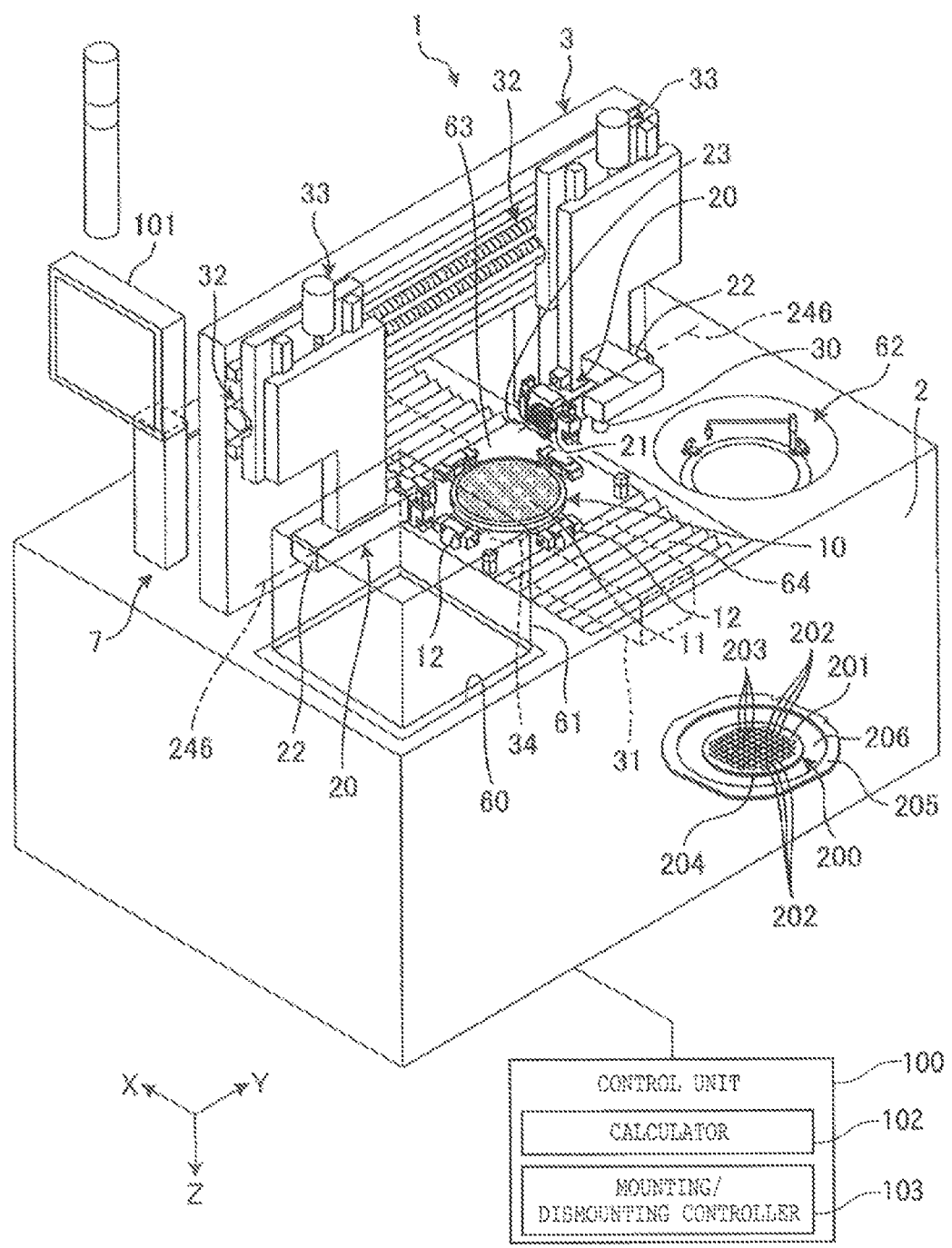
FIG. 1 is a perspective view illustrating by way of example the structure of a processing apparatus according to a first embodiment of the present invention.
Figure 2:
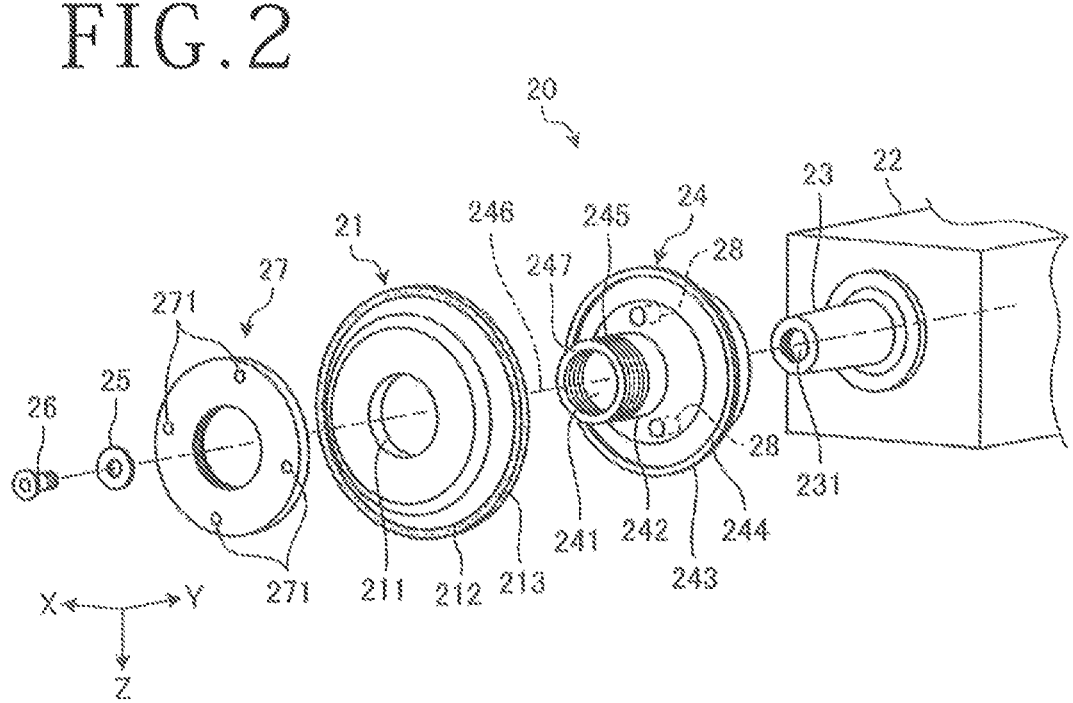
FIG. 2 is an exploded perspective view of a cutting unit of the processing apparatus illustrated in FIG. 1.
Figure 3:
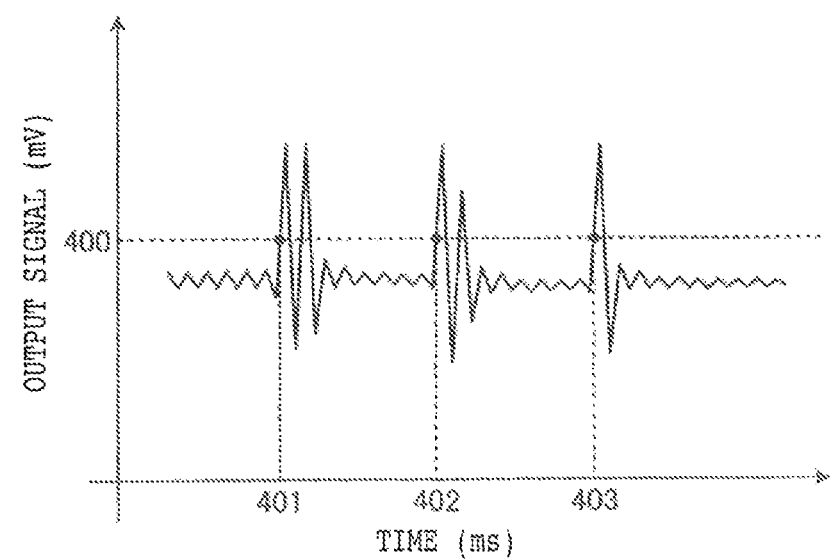
FIG. 3 is a diagram illustrating an output signal from a vibration detecting sensor included in the cutting unit illustrated in FIG. 2.
Figure 4:
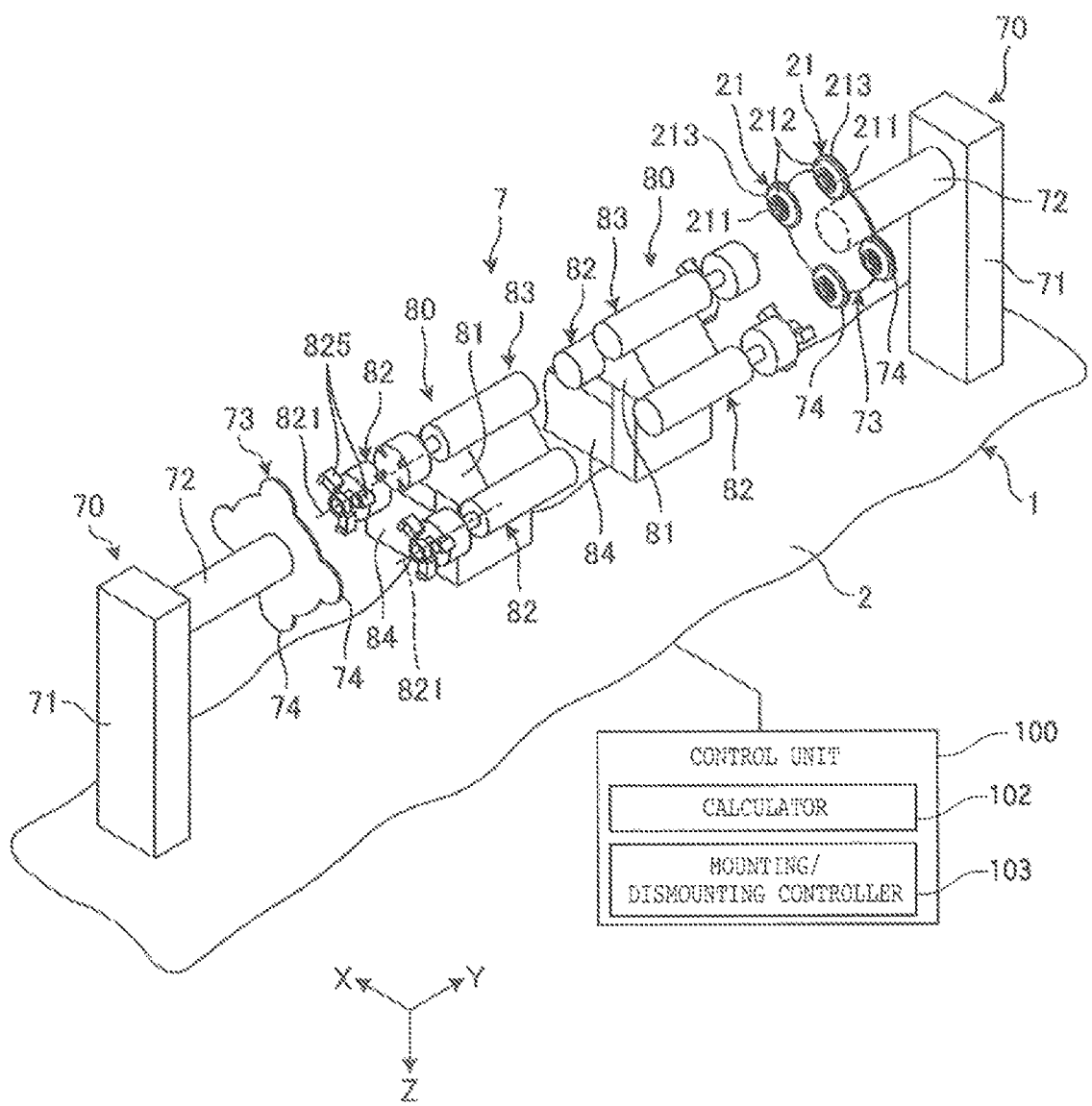
FIG. 4 is a perspective view illustrating by way of example the structure of a blade changer unit of the processing apparatus illustrated in FIG. 1.

A processing apparatus according to a first embodiment of the present invention will be described below with reference to the drawings. FIG. 1 illustrates in perspective by way of example the structure of the processing apparatus according to the first embodiment of the present invention. FIG. 2 illustrates in exploded perspective of the cutting unit of the processing apparatus illustrated in FIG. 1. FIG. 3 is a diagram illustrating an output signal from a vibration detecting sensor included in the cutting unit illustrated in FIG. 2. FIG. 4 illustrates in exploded perspective by way of example the structure of a blade changer unit of the cutting apparatus illustrated in FIG. 1.

(Cutting Apparatus)

The processing apparatus, denoted by 1, according to the first embodiment is a cutting apparatus for cutting a workpiece 200 illustrated in FIG. 1. According to the first embodiment, the workpiece 200 is in the form of a wafer such as a disk-shaped semiconductor wafer, an optical device wafer, or the like made of a base material of silicon, sapphire, gallium, or the like. The workpiece 200 has a face side 201 demarcated into a grid of areas by a grid of projected dicing lines 202 and a plurality of devices 203 formed respectively in the areas.

According to the present invention, the workpiece 200 may be what is called a TAIKO (Registered Trademark) wafer having a thin central region and a thicker region on its outer circumferential portion, a rectangular package substrate having a plurality of resin-encapsulated devices thereon, ceramic substrate, ferrite substrate, a substrate containing at least one of nickel and iron, or the like. According to the first embodiment, the workpiece 200 has a reverse side 204 stuck to an adhesive tape 206 having an outer circumferential edge portion on which an annular frame 205 is mounted, so that the workpiece 200 is supported on the annular frame 205.

The processing apparatus 1 illustrated in FIG. 1 is a cutting apparatus for holding the workpiece 200 on a holding table 10 and cutting the workpiece 200 with a cutting blade 21 along the projected dicing lines 202. As illustrated in FIG. 1, the processing apparatus 1 includes the holding table 10 that holds the workpiece 200 under suction on a holding surface 11 thereof, a pair of cutting units 20 that each cuts the workpiece 200 held on the holding table 10 with the cutting blade 21, an image capturing unit 30 that captures an image of the workpiece 200 held on the holding table 10, the blade changer unit 7, and a control unit 100 as a controller.

As illustrated in FIG. 1, the processing apparatus 1 also includes at least an X-axis moving unit 31 for processing-feeding the holding table 10 in an X-axis direction parallel to a horizontal direction, a pair of Y-axis moving units 32 for indexing-feeding the respective cutting units 20 in a Y-axis direction parallel to a horizontal direction and perpendicular to the X-axis direction, a pair of Z-axis moving units 33 for cutting-feeding the respective cutting units 20 in a Z-axis direction parallel to a vertical direction and perpendicular to both the X-axis direction and the Y-axis direction, and a rotary actuator 34 for being processing-fed in the X-axis direction by the X-axis moving unit 31 and for rotating the holding table 10 about a central axis parallel to the Z-axis direction. As illustrated in FIG. 1, the processing apparatus 1 is a two-spindle dicer, i.e., what is called a facing dual-type cutting apparatus, having the two cutting units 20.

The holding table 10 holds the workpiece 200 thereon and is processing-fed in the X-axis direction relatively to respective spindles 23 of the cutting units 20. The holding table 10 is disk-shaped and the holding surface 11 thereof for holding the workpiece 200 thereon is made of porous ceramic or the like. The holding table 10 is movable by the X-axis moving unit 31 along the X-axis direction between a processing area 63 beneath the cutting units 20 and a loading/unloading area 64, spaced from the processing area 63, where the workpiece 200 is loaded onto and unloaded from the holding table 10. The holding table 10 is rotatable about the central axis parallel to the Z-axis direction by the rotary actuator 34. The holding table 10 is connected to a vacuum suction source, not illustrated, and attracts and holds the workpiece 200 on the holding surface 11 under a vacuum developed by the vacuum suction source. According to the first embodiment, the holding table 10 attracts and holds the reverse side 204 of the workpiece 200 with the adhesive tape 206 interposed therebetween. As illustrated in FIG. 1, a plurality of clamps 12 for clamping the annular frame 205 are disposed around the holding table 10.

Each of the cutting units 20 acts as a cutting means with the cutting blade 21 removably mounted thereon for cutting the workpiece 200 held on the holding table 10. The cutting unit 20 is movable with respect to the workpiece 200 held on the holding table 10 in the Y-axis direction by the Y-axis moving unit 32 and in the Z-axis direction by the Z-axis moving unit 33.

As illustrated in FIG. 1, one of the cutting units 20 is supported on one post of a portal-shaped support frame 3 erected on an apparatus body 2 through one of the Y-axis moving units 32 and one of the Z-axis moving units 33. Similarly, the other cutting unit 20 is supported on another post of the support frame 3 through the other Y-axis moving units 32 and the other Z-axis moving unit 33. The support frame 3 also includes a horizontal beam interconnecting respective upper end portions of the posts.

The cutting units 20 are enabled by the Y-axis moving units 32 and the Z-axis moving units 33 to position their cutting blades 21 at any desired positions over the holding surface 11 of the holding table 10.

As illustrated in FIG. 2, each of the cutting units 20 includes a spindle housing 22 movable in the Y-axis direction and the Z-axis direction respectively by the Y-axis moving unit 32 and the Z-axis moving unit 33, a spindle 23 rotatably disposed in the spindle housing 22 and rotatable about its own central axis by a spindle motor, not illustrated, and a mount 24 mounted on a distal end portion of the spindle 23. The cutting unit 20 also includes a fixing screw 26 extending through a washer 25 and a through hole 241 defined centrally in the mount 24 and threaded into a screw hole 231 defined in a distal end face of the spindle 23 to fix the mount 24 to the distal end portion of the spindle 23 and a fastening nut 27 fixing the cutting blade 21, which 21 is mounted on the mount 24, to the mount 24 while sandwiching the cutting blade 21 between itself and the mount 24.

The mount 24 is fixed to the distal end portion of the spindle 23. The mount 24 includes a hollow cylindrical boss 242 extending in the Y-axis direction and a bearing flange 243 disposed on the boss 242 at an end thereof, i.e., an axially rear end thereof, closer to the spindle housing 22. The boss 242 extends in the Y-axis direction and has an outside diameter substantially equal along its entire length to the inside diameter of an insertion hole 211 defined in the cutting blade 21. That the outside diameter of the boss 242 is substantially equal to the inside diameter of the insertion hole 211 means that the outside diameter and inside diameter are the same as each other to the extent that an outer circumferential surface of the boss 242 and an inner circumferential surface of the cutting blade that defines the insertion hole 211 are able to contact each other at at least a plurality of contact points.

The bearing flange 243 is of an annular shape projecting radially outwardly from the axially rear end of the boss 242 closer to the spindle housing 22 and having an outside diameter larger than the outside diameter of the boss 242. The bearing flange 243 supports the cutting blade 21 on an outer edge portion 244 thereof at its distal end. The boss 242 and the bearing flange 243 are disposed coaxially with each other. The boss 242 of the mount 24 has another end portion, remote from the spindle housing 22, having an externally threaded outer circumferential surface 245.

The cutting blade 21 is in the form of an ultrathin cutting grinding stone that is of an essentially ring shape. According to the first embodiment, the cutting blade 21 is what is called a hub blade including an annular circular base 212 having the insertion hole 211 defined centrally therein, and an annular cutting edge 213 disposed on an outer circumferential edge of the insertion hole 211. The insertion hole 211 defined in the circular base 212 is a hole through which the other end portion of the boss 242 extends to mount the cutting blade 21 on the mount 24. The cutting edge 213 is made of abrasive grains of diamond, CBN (cubic boron nitride), or the like and a bonding material, i.e., a binder, made of metal, resin, or the like, and has a predetermined thickness. According to the present invention, the cutting blade 21 may be a washer blade that has only the cutting edge 213.

The cutting blade 21 thus constructed is fitted over the hollow cylindrical boss 242 of the mount 24 that extends through the insertion hole 211 in the circular base 212. The cutting blade 21 is sandwiched between and fixed in position by the bearing flange 243 of the mount 24 and the fastening nut 27 that is threaded over the externally threaded outer circumferential surface 245 of the boss 242. As illustrated in FIG. 2, the fastening nut 27 has four pin fitting holes 271 defined in an end face thereof at equally spaced intervals in circumferential directions thereof.

The spindle 23, the mount 24, the cutting blade 21, and the fastening nut 27 of the cutting unit 20 are positioned coaxially with each other. The spindle 23, the mount 24, and the cutting blade 21, and the fastening nut 27 of the cutting unit 20 have a central axis 246 parallel to the Y-axis direction. In other words, the direction of the central axis of the spindle 23 is the Y-axis direction.

According to the first embodiment, as illustrated in FIG. 2, the cutting unit 20 has two vibration detecting sensors 28 for detecting vibrations. According to the first embodiment, the vibration detecting sensors 28 are AE sensors for detecting vibrations due to elastic waves, which have a frequency ranging from several tens of kHz to several MHz, propagated through the spindle 23 and the mount 24 of the cutting unit 20. According to the first embodiment, the vibration detecting sensors 28 are embedded in the bearing flange 243 of the mount 24, and are electrically connected to the control unit 100.

According to the first embodiment, the two vibration detecting sensors 28 are disposed at respective positions that are symmetric with respect to the central axis of the bearing flange 243, i.e., at respective positions that are diametrically opposite each other across the central axis of the bearing flange 243 and equally spaced from the central axis of the bearing flange 243. According to the present invention, alternatively, one of the vibration detecting sensors 28 may be disposed at one of the positions that are symmetric with respect to the central axis of the bearing flange 243, whereas a weight that has the same mass and size as the vibration detecting sensor 28 may be disposed at the other position. Therefore, it is possible to prevent the spindle 23 and the mount 24 that are rotated by the spindle motor from being displaced off-center due to the vibration detecting sensors 28.

The vibration detecting sensors 28 that are electrically connected to the control unit 100 generates and sends an output signal (see FIG. 3) having voltage values depending on vibrations detected thereby to the control unit 100. The larger the vibrations detected by the vibration detecting sensors 28 are, the higher the voltage values of the output signal generated by the vibration detecting sensors 28 are.

The image capturing unit 30 is fixed to one of the cutting units 20 for movement in unison therewith. The image capturing unit 30 includes an image capturing device for capturing an image of an area to be divided of the workpiece 200 held on the holding table 10 before the workpiece 200 is cut. The image capturing device may be a CCD (charge-coupled device) image sensor or a CMOS (complementary metal-oxide-silicon) image sensor, for example. The image capturing unit 30 captures an image of the workpiece 200 held on the holding table 10 for use in an alignment step for positioning the workpiece 200 and the cutting blade 21 in alignment with each other, and outputs the captured image to the control unit 100.

The X-axis moving unit 31 moves the holding table 10 in the X-axis direction as a processing-feed direction, thereby processing-feeding the holding table 10 and the cutting units 20 along the X-axis direction relatively to each other. The Y-axis moving unit 32 moves the cutting units 20 in the Y-axis direction as an indexing-feed direction, thereby indexing-feeding the holding table 10 and the cutting units 20 along the Y-axis direction relatively to each other. The Z-axis moving unit 33 moves the cutting units 20 in the Z-axis direction as a cutting-feed direction, thereby cutting-feeding the holding table 10 and the cutting units 20 along the Z-axis direction relatively to each other.

Each of the X-axis moving unit 31, the Y-axis moving unit 32, and the Z-axis moving unit 33 includes a known ball screw rotatable about its own central axis, a known electric motor for rotating the ball screw about its own central axis, and a pair of known guide rails on which the holding table 10 or the cutting units 20 are movably supported for movement in the X-axis direction, the Y-axis direction, or the Z-axis direction.

The processing apparatus 1 further includes an X-axis direction position detecting unit, not illustrated, for detecting the position of the holding table 10 in the X-axis direction, a Y-axis direction position detecting unit, not illustrated, for detecting the positions of the cutting units 20 in the Y-axis direction, and a Z-axis direction position detecting unit, not illustrated, for detecting the positions of the cutting units 20 in the Z-axis direction. Each of the X-axis direction position detecting unit and the Y-axis direction position detecting unit may include a linear scale parallel to the X-axis direction or the Y-axis direction and a reading head. The Z-axis direction position detecting unit may detect the positions of the cutting units 20 in the Z-axis direction on the basis of pulses of the electric motors of the Z-axis moving units 33. The X-axis direction position detecting unit, the Y-axis direction position detecting unit, and the Z-axis direction position detecting unit output the position of the holding table 10 in the X-axis direction and the positions of the cutting units 20 in the Y-axis direction or the Z-axis direction to the control unit 100. According to the first embodiment, the positions of components of the processing apparatus 1 in the X-axis direction, the Y-axis direction, and the Z-axis direction are determined as positions with reference to predetermined reference positions, not illustrated.

The processing apparatus 1 also includes a cassette elevator 60 for placing thereon a cassette 61 that houses workpieces 200 which are to be cut and have been cut and moving the cassette 61 in the Z-axis direction, a cleaning unit 62 for cleaning workpieces 200 which have been cut, and a feed unit, not illustrated, for taking workpieces 200 into and out of the cassette 61 and feeding workpieces 200.

(Blade Changer Unit)

The blade changer unit 7 mounts a cutting blade 21 on or dismounts a cutting blade 21 from the boss 242 of the mount 24 fixed to the distal end portion of the spindle 23 of each of the cutting units 20 that is positioned in a mounting/dismounting position. The mounting/dismounting position is a predetermined position in the X-axis direction, the Y-axis direction, and the Z-axis direction, where each of the cutting units 20 is positioned for mounting or dismounting a cutting blade 21 with the blade changer unit 7.

As illustrated in FIG. 1, the blade changer unit 7 is disposed behind the support frame 3 in a position that is more spaced from the loading/unloading area 64 than the processing area 63. As illustrated in FIG. 4, the blade changer unit 7 includes blade stockers 70 for holding cutting blades 21 that are to be changed and that have been changed, and blade mounting/dismounting units 80 for mounting cutting blades 21 on and dismounting cutting blades 21 from the spindles 23 of the respective cutting units 20 and delivering cutting blades 21 between the blade stockers 70 and the cutting units 20.

According to the first embodiment, the blade stockers 70 and the blade mounting/dismounting units 80 are associated with each other in pairs, and are also associated with the cutting units 20 in pairs. That is, the blade changer unit 7 includes a pair of blade stockers 70 and a pair of blade mounting/dismounting units 80.

According to the first embodiment, one of the blade stockers 70 holds a plurality of cutting blades 21 that are to be mounted on and that have been dismounted from the spindle 23 of one of the cutting units 20. One of the blade mounting/dismounting units 80 mounts a cutting blade 21 on or dismounts a cutting blade 21 from one of the cutting units 20 and delivers cutting blades 21 between one of the blade stockers 70 and one of the cutting units 20. According to the first embodiment, the other of the blade stockers 70 holds a plurality of cutting blades 21 that are to be mounted on and that have been dismounted from the spindle 23 of the other of the cutting units 20. The other of the blade mounting/dismounting units 80 mounts a cutting blade 21 on or dismounts a cutting blade 21 from the other of the cutting units 20 and delivers cutting blades 21 between the other of the blade stockers 70 and the other of the cutting units 20.

The cutting blades 21 that are held by each of the blade stockers 70 include cutting blades not yet in use, cutting blades already used but still usable as their service life has not been ended, cutting blades of one type and/or different types.

Next, each of the components of the blade changer unit 7 will be described below.

(Blade Stocker)

Figure 5:
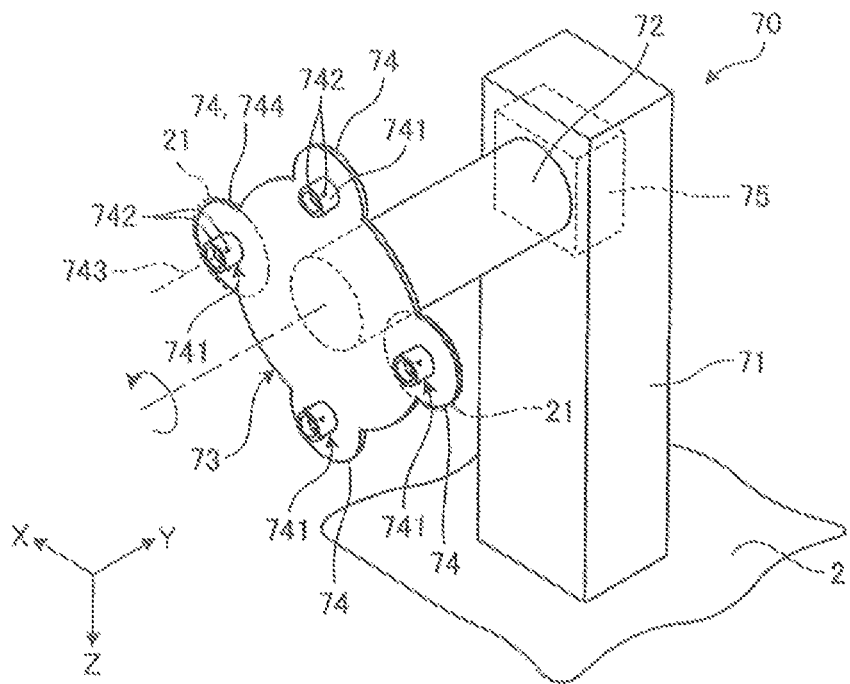
FIG. 5 is a perspective view illustrating by way of example the structure of a blade stocker of the blade changer unit illustrated in FIG. 4.
Figure 6:
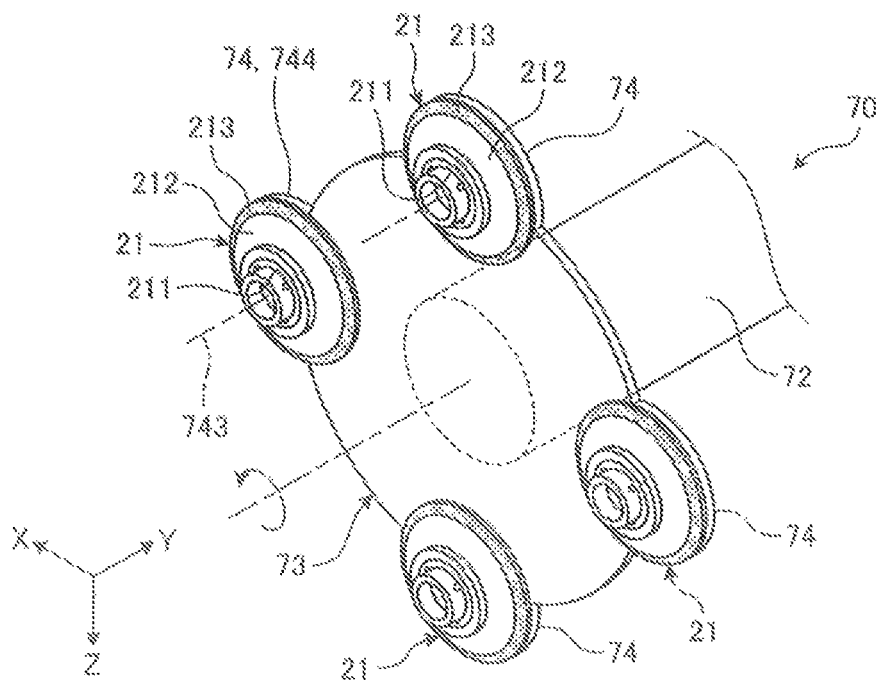
FIG. 6 is a perspective view illustrating the manner in which the blade stocker illustrated in FIG. 5 holds a plurality of cutting blades.

FIG. 5 illustrates in perspective by way of example the structure of one of the blade stockers 70 of the blade changer unit 7 illustrated in FIG. 4. FIG. 6 illustrates in perspective the manner in which the blade stocker 70 illustrated in FIG. 5 holds a plurality of cutting blades 21.

The blade stocker 70 holds replacement cutting blades 21 to be mounted on the corresponding cutting unit 20 and replaced cutting blades 21 that have been dismounted from the corresponding cutting unit 20. Since the two blade stockers 70 are structurally identical to each other, only the blade stocker 70 that is illustrated on the far side in FIG. 4 will be described as a representative one below. Those parts of the other blade stocker 70 that are identical to those of the representative blade stocker 70 are denoted by identical reference characters and will not be described in detail below.

As illustrated in FIGS. 4 and 5, the blade stocker 70 includes a post 71 disposed on the apparatus body 2 and a support member 73 mounted on an upper end portion of the post 71 by a rotational shaft 72. The support member 73 is disposed in facing relation to the corresponding blade mounting/dismounting unit 80 along the Y-axis direction. The support member 73 has a plurality of, i.e., four in the first embodiment, blade holders 74 concentrically disposed on a face side thereof that faces the corresponding blade mounting/dismounting unit 80, for holding a plurality of, i.e., four in the first embodiment, cutting blades 21 that are to be mounted on and that are dismounted from the corresponding cutting unit 20.

Each of the blade holders 74 holds a cutting blade 21 thereon. The blade holder 74 includes a hollow cylindrical blade fitting member 741 to be inserted in the insertion hole 211 in the cutting blade 21 and a plurality of positioning members 742 disposed on an outer circumferential surface of the blade fitting member 741, for positioning the cutting blade 21 after the blade fitting member 741 has been inserted in the insertion hole 211 thereof. Each of the positioning members 742 includes a ball that can protrude from and retract into the outer circumferential surface of the blade fitting member 741 and a spring for normally biasing the ball radially outwardly. When the cutting blade 21 is placed on the blade holder 74, the ball fits with an inner edge of the circular base 212 until a radially inward force acting on the ball becomes a predetermined value, thereby performing a positioning function to position the cutting blade 21 on the blade holder 74.

The blade stocker 70 thus constructed holds cutting blades 21 as illustrated in FIG. 6. Specifically, when the blade fitting member 741 is inserted into the insertion hole 211 in the circular base 212 of the cutting blade 21, the ball retracts into the blade fitting member 741. When the cutting blade 21 rides over the ball, the ball springs back and protrudes from the outer circumferential surface of the blade fitting member 741, fitting with the inner edge of the insertion hole 211 thereby to hold the cutting blade 21, as illustrated in FIG. 6. According to the first embodiment, the blade fitting member 741 has a central axis 743 parallel to the Y-axis direction.

The rotational shaft 72 by which the support member 73 is mounted on the upper end portion of the post 71 has an end disposed on the upper end portion of the post 71 and the other end coupled to the center of a reverse side of the support member 73. The end of the rotational shaft 72 that is disposed on the upper end portion of the post 71 is coupled to the drive shaft of an electric motor 75 disposed in the post 71. The support member 73 is intermittently rotatable about the central axis of the rotational shaft 72 by the rotational shaft 72. When the support member 73 is intermittently rotated by the rotational shaft 72, the support member 73 selectively positions one at a time of the blade holders 74 in a preset transfer position 744 on their orbital path.

(Blade Mounting/Dismounting Unit)

Figure 7:
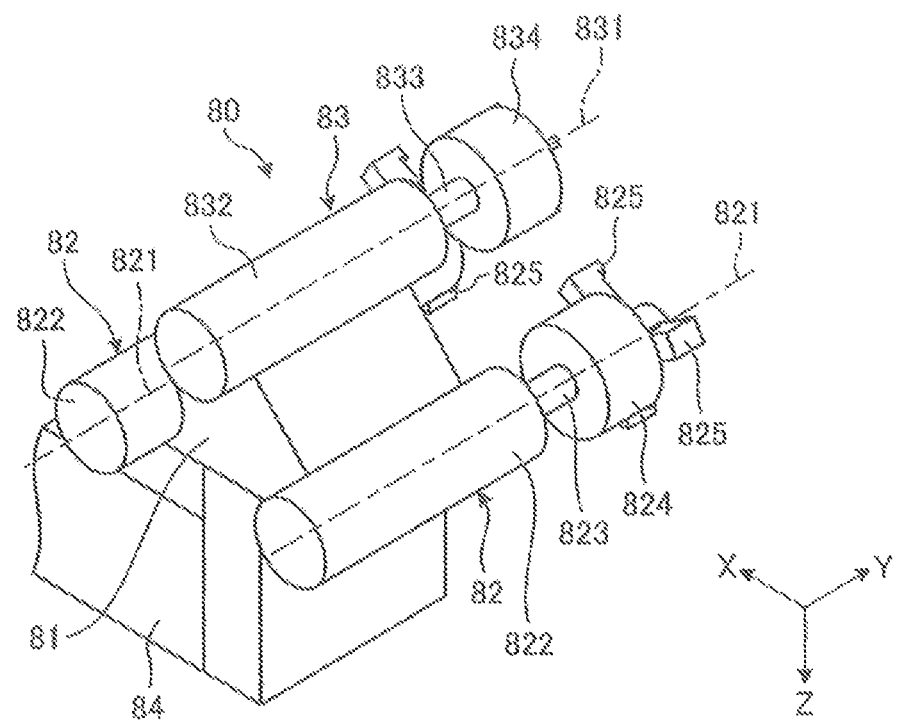
FIG. 7 is a perspective view illustrating by way of example the structure of a blade mounting/dismounting unit of the blade changer unit illustrated in FIG. 4.
Figure 8:
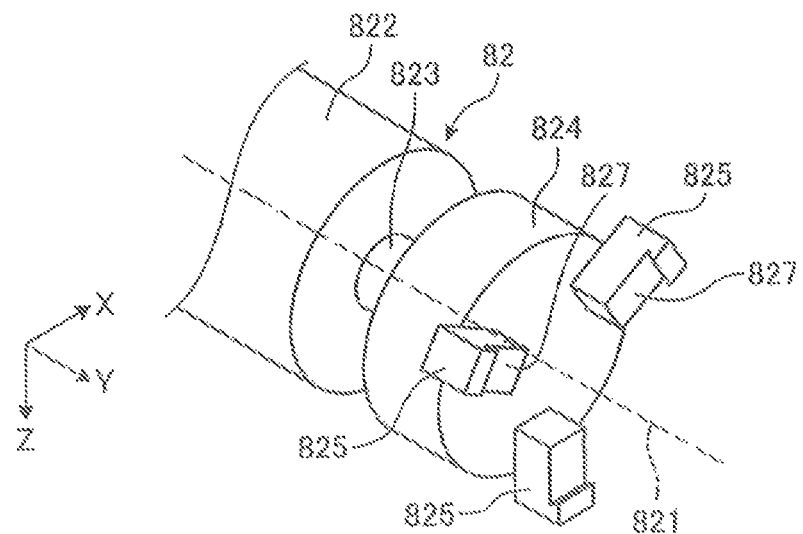
FIG. 8 is a perspective view illustrating by way of example the structure of a blade chuck of the blade mounting/dismounting unit illustrated in FIG. 7.
Figure 9:
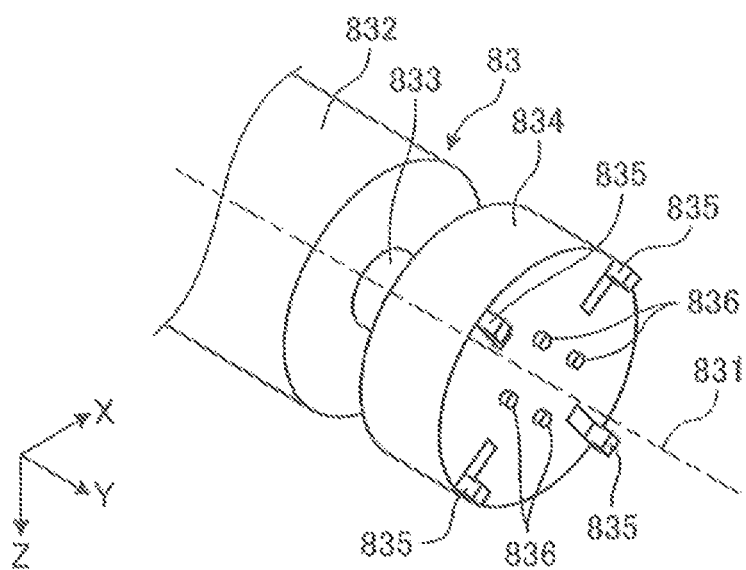
FIG. 9 is a perspective view illustrating by way of example the structure of a nut holder of the blade mounting/dismounting unit illustrated in FIG. 7.

FIG. 7 illustrates in perspective by way of example the structure of the blade mounting/dismounting unit 80 of the blade changer unit 7 illustrated in FIG. 4. FIG. 8 illustrates in perspective by way of example the structure of a blade chuck 82 of the blade mounting/dismounting unit 80 illustrated in FIG. 7. FIG. 9 illustrates in perspective by way of example the structure of a nut holder 83 of the blade mounting/dismounting unit 80 illustrated in FIG. 7.

Since the two blade mounting/dismounting units 80 are structurally identical to each other, only the blade mounting/dismounting unit 80 that is illustrated on the far side in FIG. 4 will be described as a representative one. Those parts of the other blade mounting/dismounting unit 80 that are identical to those of the representative blade mounting/dismounting unit 80 are denoted by identical reference characters and will not be described in detail below.

As illustrated in FIG. 7, the blade mounting/dismounting unit 80 includes a unit body 81, blade chucks 82 as blade holders, a nut holder 83 as a nut holder, and a moving unit 84 as a moving unit for supporting the unit body 81 movably thereon. According to the first embodiment, the blade mounting/dismounting unit 80 includes two blade chucks 82 and one nut holder 83.

The blade chucks 82 and the nut holder 83 are mounted on the unit body 81 and have respective central axes 821 and 831 angularly spaced from each other and extending parallel to each other. According to the first embodiment, the central axes 821 of the blade chucks 82 and the central axis 831 of the nut holder 83 extend parallel to the Y-axis direction.

The blade chucks 82 hold respective cutting blades 21 thereon. As illustrated in FIG. 8, each of the blade chucks 82 includes a casing 822 fixed to the unit body 81 and having a hollow cylindrical appearance, a disk-shaped support base 824 mounted on a distal end of the casing 822 by an arm 823, and a plurality of grippers 825 attached to the support base 824.

The grippers 825 are circumferentially spaced from each other on an outer edge portion of an end face of the support base 824 that faces the blade holders 74 of the corresponding blade stocker 70. According to the first embodiment, there are three grippers 825 disposed at circumferentially equally spaced intervals on the outer edge portion of the end face of the support base 824. The grippers 825 are movable radially on the end face of the support base 824 by a drive mechanism, not illustrated, housed in the support base 824. When the grippers 825 are moved radially inwardly toward each other, they grip the outer circumferential surface of the circular base 212 of the cutting blade 21. When the grippers 825 are moved radially outwardly away from each other, they release the cutting blade 21.

The nut holder 83 mounts a fastening nut 27 on and dismounts a fastening nut 27 from a boss 242. As illustrated in FIG. 9, the nut holder 83 includes a casing 832 fixed to the unit body 81 and having a hollow cylindrical appearance, a spindle 833 housed in the casing 832 and rotatable about a central axis 831 parallel to the Y-axis direction, a disk-shaped support base 834 fixed to an end of the spindle 833, a plurality of grippers 835 attached to the support base 834, and a plurality of fitting pins 836 mounted on an end face of the support base 834 that faces the fastening nut 27 of the corresponding cutting unit 20.

The spindle 833 has an end projecting from the casing 832 toward the corresponding blade stocker 70. The spindle 833 has another end coupled to an electric motor, not illustrated, for rotating the spindle 833 about its own central axis.

The grippers 835 are circumferentially spaced from each other on an outer edge portion of an end face of the support base 834 that faces the blade holders 74 of the corresponding blade stocker 70. According to the first embodiment, there are four grippers 835 disposed at circumferentially equally spaced intervals on the outer edge portion of the end face of the support base 834. The grippers 835 are movable radially on the end face of the support base 834 by a drive mechanism, not illustrated, housed in the support base 834. When the grippers 835 are moved radially inwardly toward each other, they grip the outer circumferential surface of the fastening nut 27. When the grippers 835 are moved radially outwardly away from each other, they release the fastening nut 27.

The fitting pins 836 are supported on the support base 834 such that they can protrude from and retracted into the end face of the support base 834. According to the first embodiment, there are four fitting pins 836 disposed on the end face of the support base 834 at equally spaced intervals in the circumferential directions of the support base 834. When the fitting pins 836 protrude from the end face of the support base 834, they are fitted respectively in the fitting holes 271 in the fastening nut 27.

The moving unit 84 moves the unit body 81, i.e., the blade chucks 82 and the nut holder 83, along the X-axis direction, the Y-axis direction, and the Z-axis direction. The moving unit 84 moves each of the blade chucks 82 between a position where a cutting blade 21 can be mounted on and dismounted from the blade holder 74 in the transfer position 744 of the corresponding blade stocker 70 and a position where a cutting blade 21 can be mounted on and dismounted from the boss 242 of the mount 24 of the cutting unit 20 in the mounting/dismounting position. The moving unit 84 moves the nut holder 83 to a position where a fastening nut 27 can be mounted on and dismounted from the boss 242 of the mount 24 of the cutting unit 20 in the mounting/dismounting position. The moving unit 84 includes at least one ball screw, an electric motor, and guide rails.

The blade changer unit 7 further includes a changer-unit-side position detecting unit for detecting the positions in the X-axis direction and the positions in the Z-axis direction of the central axes of at least the blade chucks 82 and the nut holder 83, and the positions in the Y-axis direction of flat surfaces 827 of the grippers 825 of the blade chucks 82 for contacting an end face of the circular base 212 of a cutting blade 21 and the positions in the Y-axis direction of the grippers 835 of the nut holder 83.

In the processing apparatus 1 thus constructed above, the vibration detecting sensors 28 detect vibrations caused when the grippers 825 of the blade chuck 82 contact the mount 24 of the cutting unit 20 in the mounting/dismounting position. When the output signals output from the vibration detecting sensors 28 exceed a threshold value 400 illustrated in FIG. 3, the position in the X-axis direction and the position in the Z-axis direction of the central axis 246 of the mount 24 of the cutting unit 20 in the mounting/dismounting position, and the position in the Y-axis direction of a distal end face 247 of the boss 242 of the mount 24 can be detected. The threshold value 400 is a value lower than the output signals output from the vibration detecting sensors 28 when the vibration detecting sensors 28 detect vibrations caused when the grippers 825 of the blade chuck 82 contact the mount 24.

The control unit 100 controls the various mechanisms, described above, of the processing apparatus 1 to enable the processing apparatus 1 to perform a processing operation on the workpiece 200. The control unit 100 also detects contact between the grippers 825 and 835 and the boss 242 on the basis of the detection signals from the vibration detecting sensors 28.

The control unit 100 is a computer having an arithmetic processing apparatus having a microprocessor such as a CPU (central processing unit, a storage device having a memory such as a ROM (read only memory) or a RAM (random access memory), and an input/output interface device. The arithmetic processing apparatus of the control unit 100 performs arithmetic processing operations according to computer programs stored in the storage device and outputs control signals for controlling the processing apparatus 1 through the input/output interface device to the units, referred to above, of the processing apparatus 1.

The control unit 100 is connected to a display unit 101, illustrated in FIG. 1, including a liquid crystal display device for displaying workpiece processing states and images, and an input unit that is used by the operator to enter processing contents information. The input unit includes at least one of a touch panel on the display unit 101 and an external input device such as a keyboard or the like.

As illustrated in FIG. 1, the control unit 100 includes a calculator 102 and a mounting/dismounting controller 103. The calculator 102 calculates the position in the X-axis direction and the position in the Z-axis direction of the central axis 246 of the mount 24 from the position in the X-axis direction, i.e., an X coordinate, and the position in the Z-axis direction, i.e., a Z coordinate, that are detected by the position detecting units at the time the moving unit 84 is controlled to move the mount 24 and the blade chucks 82 relatively to each other in the X-axis direction and the Z-axis direction to bring the grippers 825 of each of the blade chucks 82 into contact with the mount 24 at at least three contact points and the output signals from the vibration detecting sensors 28 exceed the threshold value 400 as they have detected vibrations upon contact between the grippers 825 and the mount 24.

The calculator 102 also calculates the position in the Y-axis direction of the distal end face 247 of the boss 242 of the mount 24 from the position in the Y-axis direction, i.e., a Y coordinate, that are detected by the position detecting units at the time the moving unit 84 is controlled to bring the grippers 825 of each of the blade chucks 82 into contact with the end face 247 of the boss 242 of the mount 24 at at least one contact point and the output signals from the vibration detecting sensors 28 exceed the threshold value 400 as they have detected vibrations upon contact between the grippers 825 and the end face 247.

According to the first embodiment, when the grippers 825 of each of the blade chucks 82 are brought into contact with the mount 24 at respective positions thereon, the calculator 102 calculates the position in the X-axis direction, the position in the Z-axis direction and the position in the Y-axis direction that are detected by the position detecting units at the time the output signals from the two vibration detecting sensors 28 exceed the threshold value 400, and thereafter calculates the position in the X-axis direction and the position in the Z-axis direction of the central axis 246 of the mount 24 and the position in the Y-axis direction of the distal end face 247 of the boss 242 of the mount 24.

The mounting/dismounting controller 103 mounts a cutting blade 21 on or dismounts a cutting blade 21 from the boss 242 of a cutting unit 20 in the position, calculated by the calculator 102, where the central axis 246 of the mount 24 calculated by the calculator 102 and the central axis 821 of the blade chuck 82 are coaxial with each other. The mounting/dismounting controller 103 also mounts a cutting blade 21 on or dismounts a cutting blade 21 from the boss 242 of a cutting unit 20 in the position, calculated by the calculator 102, in the Y-axis direction of the distal end face 247 of the boss 242.

The functions of the calculator 102 and the mounting/dismounting controller 103 are realized when the arithmetic processing apparatus performs arithmetic processing operations according to computer programs stored in the storage device of the control unit 100. The storage device of the control unit 100 stores the position in the X-axis direction and the position in the Z-axis direction of the central axis 745 of the blade holder 74 in the transfer position 744 of each blade stocker 70, and also stores the position in the Y-axis direction of the blade fitting member 741 of the blade holder 74 in the transfer position 744 of each blade stocker 70. The storage device of the control unit 100 further stores the position in the X-axis direction and the position in the Z-axis direction of the central axis 246 of the boss 242 of the mount 24 of each cutting unit 20 positioned in the mounting/dismounting position, and also stores the position in the Y-axis direction of the distal end face 247 of the boss 242 of the mount 24 of each cutting unit 20 positioned in the mounting/dismounting position.

(Processing Operation of the Processing Apparatus)

A processing operation of the processing apparatus 1 of the above structure will be described below. In preparation for the processing operation, the operator registers processing contents information in the control unit 100, takes workpieces 200 to be cut into the cassette 61, and places the cassette 61 on an upper surface of the cassette elevator 60. In preparation for the processing operation, furthermore, the operator places cutting blades 21 on the blade holders 74 of each of the blade stockers 70 of the blade changer unit 7.

Thereafter, in response to an instruction from the operator to start the processing operation, the processing apparatus 1 starts the processing operation. When the processing apparatus 1 has started the processing operation, the control unit 100 controls the feed unit to deliver a workpiece 200 from within the cassette 61 to the holding table 10 in the loading/unloading area 64, where the reverse side 204 of the workpiece 200 supported on the annular frame 205 by the adhesive tape 206 is held under suction on the holding surface 11 of the holding table 10, and controls the clamps 12 to clamp the annular frame 205.

The control unit 100 controls the X-axis moving unit to move the holding table 10 toward the processing area 63, controls the image capturing unit 30 to capture an image of the workpiece 200, and carries out an alignment step for positioning the workpiece 200 and the cutting units 20 in alignment with each other on the basis of the image captured by the image capturing unit 30. Then, the control unit 100 moves the workpiece 200 and the cutting units 20 relatively to each other along the projected dicing lines 202, and causes the cutting blades 21 to cut into the workpiece 200 along the projected dicing lines 202 into individual device chips that carry the respective devices 203. Thereafter, the control unit 100 controls the cleaning unit 62 to clean the workpiece 200 as divided into the device chips and then controls the feed unit to take the workpiece 200 back into the cassette 61. Subsequently, the control unit 100 controls the cutting units 20 to successively cut the workpieces 200 taken out of the cassette 61, and finishes the processing operation when all the workpieces 200 from the cassette 61 have been cut.

(Cutting Blade Mounting/Dismounting Operation)

Next, an operation of the blade changer unit 7 of the processing apparatus 1 of the above structure for mounting/dismounting a cutting blade 21 will be described below. According to the first embodiment, the control unit 100 operates to mount and dismount a cutting blade 21 if it decides that the cutting blade 21 of at least one of the cutting units 20 has reached a blade changing timing while the processing apparatus 1 is in the processing operation. The blade changing timing refers to a timing to change the cutting blade 21 of each of the cutting units 20. The blade changing timing is reached each time the cutting blade 21 has cut a preset number of workpieces 200 or when the measured outside diameter of the cutting blade 21 becomes smaller than a preset numerical value, for example, and is registered as part of the processing contents information in the control unit 100. Furthermore, the blade changing timing according to the present invention may be sometime while a workpiece 200 is being processed or may be when a workpiece 200 is changed while a plurality of workpieces 200 are being processed in succession.

The operation of the blade changer unit 7 of the processing apparatus 1 for mounting and dismounting the cutting blade 21 refers to a step of removing the cutting blade 21 of a cutting unit 20 and attaching a cutting blade 21 from a blade stocker 70 to the cutting unit 20. In other words, the operation for mounting and dismounting the cutting blade 21 refers to a step of replacing the cutting blade 21 mounted on a cutting unit 20 with a cutting blade 21 held by a blade stocker 70.

In the operation for mounting and dismounting the cutting blade 21, the mounting/dismounting controller 103 of the control unit 100 stops rotating the spindle 23 of a cutting unit 20 that has reached a blade changing timing, and controls the moving unit 84 to position the cutting unit 20 that has reached the blade changing timing in the mounting/dismounting position. In the operation for mounting and dismounting a cutting blade 21, furthermore, the mounting/dismounting controller 103 controls the electric motor 75 of the blade stocker 70 corresponding to the cutting unit 20 that has reached the blade changing timing to position a cutting blade 21 to be mounted on the cutting unit 20 that has reached the blade changing timing in the transfer position 744.

In the operation for mounting and dismounting the cutting blade 21, the mounting/dismounting controller 103 controls operation of the moving unit 84 of the corresponding blade mounting/dismounting unit 80 on the basis of the position in the X-axis direction and the position in the Z-axis direction of the central axis 246 of the mount 24 of the cutting unit 20 in the mounting/dismounting position, the position in the Y-axis direction of the distal end face 247 of the mount 24 of the cutting unit 20 in the mounting/dismounting position, the positions being stored in the storage device, and the detection signals from the position detecting units.

In the operation for mounting and dismounting the cutting blade 21, the mounting/dismounting controller 103 controls the moving unit 84 to position one of the blade chucks 82 in a position where the grippers 825 of the blade chuck 82 can grip the cutting blade 21 held on the blade holder 74 in the transfer position 744 on the blade stocker 70. The mounting/dismounting controller 103 controls the blade chuck 82 to cause the grippers 825 thereof to grip the cutting blade 21 held on the blade holder 74 in the transfer position 744 on the blade stocker 70.

The mounting/dismounting controller 103 controls the moving unit 84 to move the blade mounting/dismounting unit 80 toward the cutting unit 20 in the mounting/dismounting position and position the nut holder 83 in a position where the grippers 835 thereof can grip the fastening nut 27 of the cutting unit 20 in the mounting/dismounting position. The mounting/dismounting controller 103 controls the nut holder 83 to cause the grippers 835 thereof to grip the fastening nut 27 and rotate the spindle 833 thereof about the central axis 831 in a direction to remove the fastening nut 27 from the externally threaded outer circumferential surface 245 of the boss 242. The fitting pins 836 are fitted into the respective pin fitting holes 271, allowing the fastening nut 27 to rotate with the support base 834 of the nut holder 83. The mounting/dismounting controller 103 controls the nut holder 83 to rotate the spindle 833 until the fastening nut 27 disengages from the externally threaded outer circumferential surface 245, whereupon the mounting/dismounting controller 103 stops rotating the spindle 833. The mounting/dismounting controller 103 controls the moving unit 84 to move the other blade chuck 82 toward the cutting unit 20 in the mounting/dismounting position and position the other blade chuck 82 in a position where the grippers 825 thereof can grip the cutting blade 21 mounted on the cutting unit 20 from which the fastening nut 27 has been removed.

The mounting/dismounting controller 103 controls the other blade chuck 82 to cause the grippers 825 thereof to grip the cutting blade 21 of the cutting unit 20 from which the fastening nut 27 has been removed. The mounting/dismounting controller 103 controls the moving unit 84 to move the cutting blade 21 gripped by the other blade chuck 82 away along the Y-axis direction from the mount 24 of the cutting unit 20 from which the fastening nut 27 has been removed, pulling the boss 242 of the mount 24 of the cutting unit 20 from which the fastening nut 27 has been removed from within the insertion hole 211 in the cutting blade 21 gripped by the other blade chuck 82.

The mounting/dismounting controller 103 controls the moving unit 84 to move the one blade chuck 82 toward the cutting unit 20 from which the fastening nut 27 and the cutting blade 21 have been removed, and position the one blade chuck 82 in a position where the gripped cutting blade 21 is juxtaposed with and spaced in the Y-axis direction from the mount 24 of the cutting unit 20 from which the fastening nut 27 and the cutting blade 21 have been removed. At this time, the mounting/dismounting controller 103 positions the one blade chuck 82 in a position where the central axis 821 thereof is coaxial with, i.e., is in line with, the central axis 246 of the mount 24 of the cutting unit 20 from which the fastening nut 27 and the cutting blade 21 have been removed.

The mounting/dismounting controller 103 controls the moving unit 84 to move the one blade chuck 82 along the Y-axis direction closely to the cutting unit 20 from which the fastening nut 27 and the cutting blade 21 have been removed, and insert the boss 242 of the mount 24 of the cutting unit 20 from which the fastening nut 27 and the cutting blade 21 have been removed into the insertion hole 211 in the cutting blade 21 gripped by the one blade chuck 82. The mounting/dismounting controller 103 controls the moving unit 84 to position the one blade chuck 82 in a position where the circular base 212 of the cutting blade 21 gripped by the one blade chuck 82 contacts the outer edge portion 244 of the bearing flange 243 of the mount 24, and releases the grippers 825 of the one blade chuck 82 from the cutting blade 21.

The mounting/dismounting controller 103 controls the moving unit 84 to move the one blade chuck 82 away from the boss 242 of the mount 24 of the cutting unit 20 on which the cutting blade 21 has been mounted, and position the nut holder 83 in a position where the fastening nut 27 gripped by the nut holder 83 can be threaded over the externally threaded outer circumferential surface 245 of the boss 242 of the mount 24 of the cutting unit 20 on which the cutting blade 21 has been mounted. The mounting/dismounting controller 103 controls the nut holder 83 to rotate the spindle 833 thereof about the central axis 831 in a direction to put the fastening nut 27 onto the externally threaded outer circumferential surface 245 while gripping the fastening nut 27 with the grippers 835. The mounting/dismounting controller 103 controls the nut holder 83 to rotate the spindle 833 thereof until the fastening nut 27 is threaded over the externally threaded outer circumferential surface 245, and thereafter stop rotating the spindle 833, and releases the grippers 835 of the nut holder 83 from the fastening nut 27.

The mounting/dismounting controller 103 controls the moving unit 84 to move the blade mounting/dismounting unit 80 toward the blade stocker 70, and position the other blade chuck 82 in a position where the gripped cutting blade 21 is juxtaposed with and spaced in the Y-axis direction from the blade holder 74 in the transfer position 744. At this time, the mounting/dismounting controller 103 positions the other blade chuck 82 in a position where the central axis 821 thereof is coaxial with, i.e., is in line with, the central axis 745 of the blade fitting member 741 of the blade holder 74 in the transfer position 744.

The mounting/dismounting controller 103 controls the moving unit 84 to bring the other blade chuck 82 along the Y-axis direction closely to the blade holder 74 in the transfer position 744, and insert the blade fitting member 741 into the insertion hole 211 in the cutting blade 21 gripped by the other blade chuck 82. The mounting/dismounting controller 103 controls the moving unit 84 to position the other blade chuck 82 in a position where the circular base 212 of the cutting blade 21 gripped by the other blade chuck 82 contacts the blade holder 74 in the transfer position 744, and releases the grippers 825 of the other blade chuck 82 from the cutting blade 21.

The mounting/dismounting controller 103 controls the moving unit 84 to move the blade mounting/dismounting unit 80 to a standby position, and thereafter finishes the operation to mount and dismount the cutting blade. As described above, the mounting/dismounting controller 103 of the control unit 100 aligns the central axis 246 of the boss 242 of the mount 24 with the central axes 821 of the blade chucks 82 and mounts a cutting blade 21 on and dismounts a cutting blade 21 from the mount 24.

(Mount Position Calculating Operation)

Figure 10:
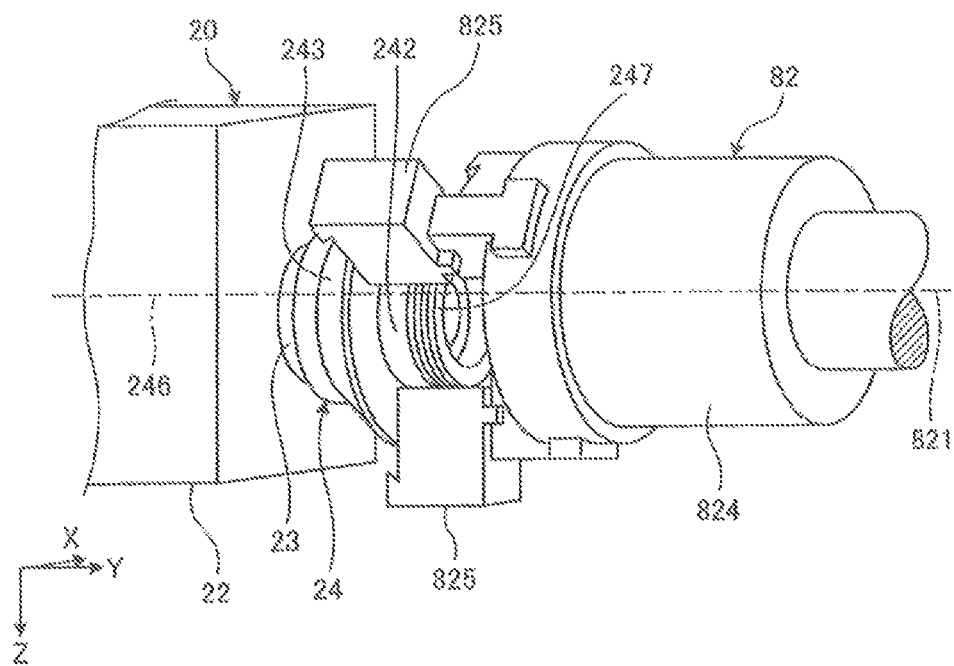
FIG. 10 is a perspective view illustrating the manner in which grippers of the blade chuck and an outer circumferential surface of a boss are held in contact with each other in a position calculating operation for calculating the position of the central axis of a mount of the processing apparatus illustrated in FIG. 1.
Figure 11:
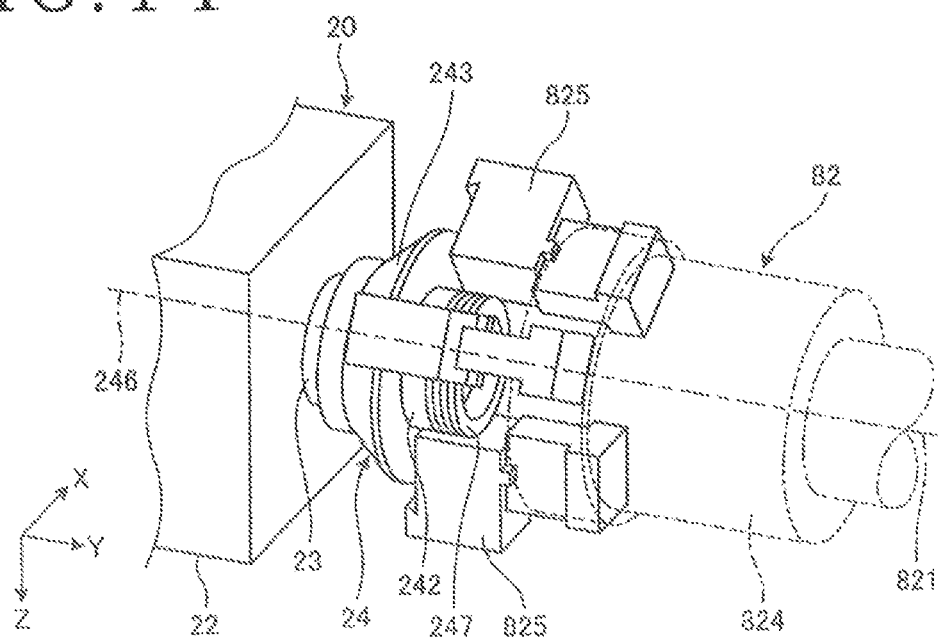
FIG. 11 is another perspective view illustrating the manner in which the grippers of the blade chuck and the outer circumferential surface of the boss are held in contact with each other in the position calculating operation for calculating the position of the central axis of the mount of the processing apparatus illustrated in FIG. 1.
Figure 12:
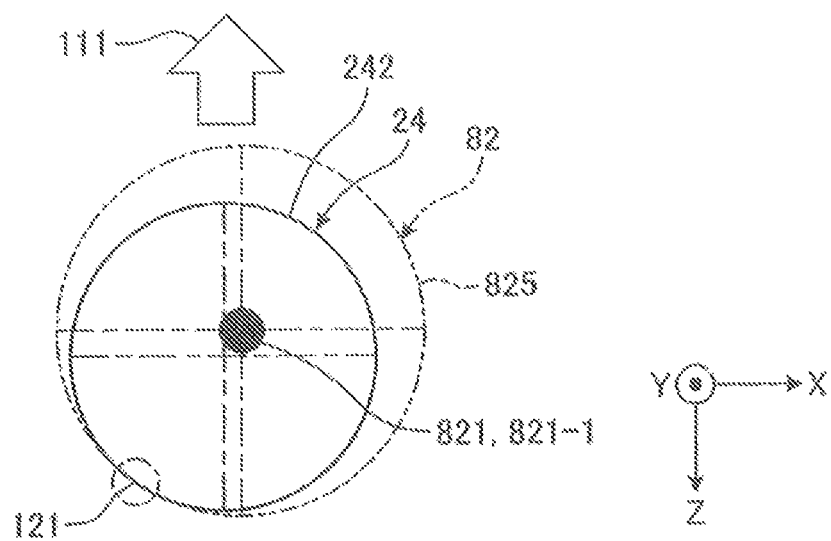
FIG. 12 is a view schematically illustrating the manner in which the grippers of the blade chuck and the outer circumferential surface of the boss are held in contact with each other at a first contact point in the position calculating operation for calculating the position of the central axis of the mount of the processing apparatus illustrated in FIG. 1.
Figure 13:
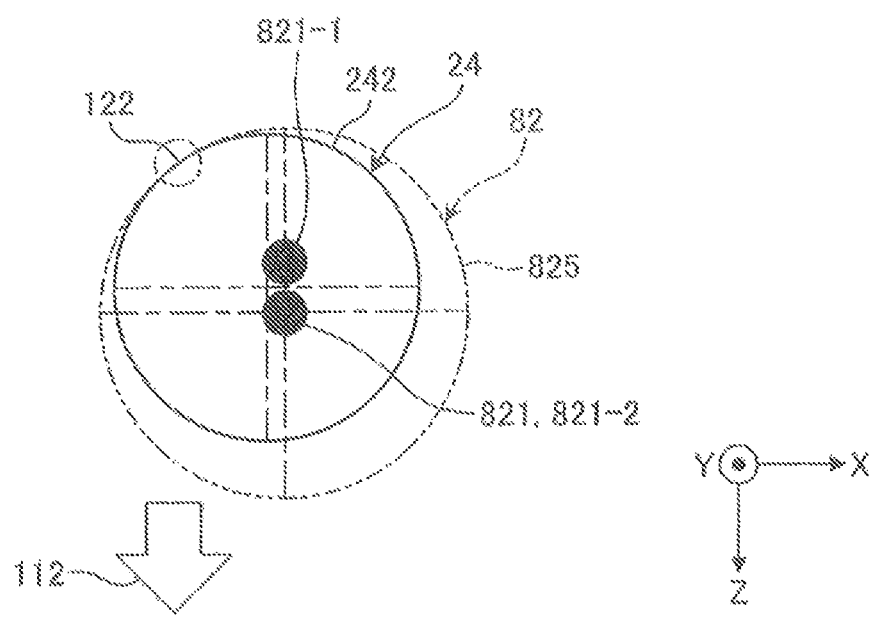
FIG. 13 is a view schematically illustrating the manner in which the grippers of the blade chuck and the outer circumferential surface of the boss are held in contact with each other at a second contact point in the position calculating operation for calculating the position of the central axis of the mount of the processing apparatus illustrated in FIG. 1.
Figure 14:
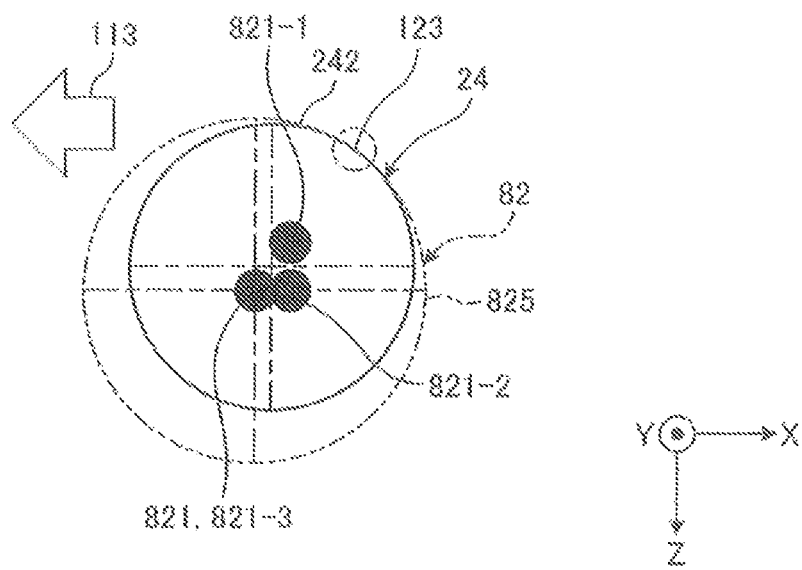
FIG. 14 is a view schematically illustrating the manner in which the grippers of the blade chuck and the outer circumferential surface of the boss are held in contact with each other at a third contact point in the position calculating operation for calculating the position of the central axis of the mount of the processing apparatus illustrated in FIG. 1.

Next, an operation of the blade changer unit 7 of the processing apparatus 1 of the above structure for calculating the position of the boss 242 of the mount 24 of the processing apparatus 1 constructed as described above will be described below. FIG. 10 illustrates in perspective the manner in which the grippers of the blade chuck and the outer circumferential surface of the boss are held in contact with each other in a position calculating operation for calculating the position of the central axis of the mount of the processing apparatus illustrated in FIG. 1. FIG. 11 illustrates in perspective the manner in which the grippers of the blade chuck and the outer circumferential surface of the boss are held in contact with each other in the position calculating operation for calculating the position of the central axis of the mount of the processing apparatus illustrated in FIG. 1. FIG. 12 schematically illustrates the manner in which the grippers of the blade chuck and the outer circumferential surface of the boss are held in contact with each other at a first contact point in the position calculating operation for calculating the position of the central axis of the mount of the processing apparatus illustrated in FIG. 1. FIG. 13 schematically illustrates the manner in which the grippers of the blade chuck and the outer circumferential surface of the boss are held in contact with each other at a second contact point in the position calculating operation for calculating the position of the central axis of the mount of the processing apparatus illustrated in FIG. 1. FIG. 14 schematically illustrates the manner in which the grippers of the blade chuck and the outer circumferential surface of the boss are held in contact with each other at a third contact point in the position calculating operation for calculating the position of the central axis of the mount of the processing apparatus illustrated in FIG. 1.

According to the first embodiment, the control unit 100 carries out the operation for calculating the position of the mount 24 if it decides that a position calculating timing to calculate the position of the boss 242 of the mount 24 of at least one of the cutting units 20 has been reached. The position calculating timing refers to a timing to calculate the position in the X-axis direction and the position in the Z-axis direction of the central axis 246 of the boss 242 of the mount 24 of each cutting unit 20 in the mounting/dismounting position and also calculate the position in the Y-axis direction of the distal end face 247 of the boss 242. The position calculating timing is reached each time the cutting blade 21 has cut a preset number of workpieces 200, desirably immediately before each cutting blade 21 is to be changed, and is registered as part of the processing contents information in the control unit 100. According to the present invention, furthermore, the position calculating operation may be carried out anytime by the operator controlling the input unit.

In the position calculating operation for calculating the position of the central axis 246 of the mount 24, the calculator 102 of the control unit 100 performs an operation for calculating the position of the central axis 246 of the mount 24 of the cutting unit 20 in the mounting/dismounting position. In the position calculating operation for calculating the position of the central axis 246 of the mount 24, the calculator 102 of the control unit 100 stops rotating the spindle 23 of the cutting unit 20 that has reached the position calculating timing, and controls the moving unit 84 to position the cutting unit 20 that has reached the position calculating timing in the mounting/dismounting position. In the position calculating operation for calculating the position of the central axis 246 of the mount 24, as in the operation for mounting and dismounting a cutting blade 21, the calculator 102 of the control unit 100 removes the fastening nut 27 and the cutting blade 21 from the cutting unit 20 that has reached the position calculating timing, brings the grippers 825 of the blade chuck 82 into contact with the boss 242 of the mount 24 of the cutting unit 20 in the mounting/dismounting position, as illustrated in FIGS. 10 and 11, and calculates the position in the X-axis direction and the position in the Z-axis direction of the boss 242 of the mount 24 of the cutting unit 20 in the mounting/dismounting position.

In the position calculating operation for calculating the position of the mount 24, the calculator 102 controls operation of the moving unit 84 of the corresponding blade mounting/dismounting unit 80 on the basis of the position in the X-axis direction and the position in the Z-axis direction of the central axis 246 of the mount 24 of the cutting unit 20 in the mounting/dismounting position, the position in the Y-axis direction of the distal end face 247 of the mount 24 of the cutting unit 20 in the mounting/dismounting position, the positions being stored in the storage device, and the detection signals from the position detecting units.

For calculating the position in the X-axis direction and the position in the Z-axis direction of the boss 242 of the mount 24 of cutting unit 20 in the mounting/dismounting position, the calculator 102 controls the moving unit 84 to move the unit body 81 of the blade mounting/dismounting unit 80 to keep the grippers 825 of either one of the blade chucks 82 that has not gripped a cutting blade 21 away from each other, and position the grippers 825 closely to the outer circumferential surface of the boss 242 of the mount 24 of the cutting unit 20 from which the fastening nut 27 and the cutting blade 21 have been removed, so that the outer circumferential surface of the boss 242 and the blade chuck 82 can be brought into contact with each other through fine adjustments. The calculator 102 controls the moving unit 84 to move either one blade chuck 82 in a first direction 111 illustrated in FIG. 12 perpendicular to the central axis 821. According to the first embodiment, the first direction 111 is illustrated as an upward direction along the Z-axis direction. However, the present invention is not limited to such a direction.

Then, as illustrated in FIG. 12, the grippers 825 contact the outer circumferential surface of the boss 242 at a first contact point 121. The calculator 102 recognizes that the output signals from the vibration detecting sensors 28 exceed the threshold value 400 at time 401 in FIG. 3, recognizing that the grippers 825 have contacted the outer circumferential surface of the boss 242 at the first contact point 121, and stops moving the blade mounting/dismounting unit 80 of the moving unit 84. The calculator 102 calculates the position in the X-axis direction and the position in the Z-axis direction of the central axis 821 (hereinafter denoted by 821-1) at the time the grippers 825 have contacted the outer circumferential surface of the boss 242 at the first contact point 121 on the basis of the detection signals from the position detecting units at time 401 when the output signals from the vibration detecting sensors 28 exceed the threshold value 400, and temporarily stores the calculated positions in the storage device. In FIGS. 12, 13, and 14, the outer circumferential surface of the boss 242 is schematically indicated by a solid-line circle, whereas a circle inscribed in the grippers 825 is schematically indicated by a two-dot-dash-line circle. In FIG. 3, the horizontal axis represents time elapsed after the position calculating operation for calculating the position of the central axis 246 of the mount 24 has started, and the vertical axis represents the output signals from the vibration detecting sensors 28.

The calculator 102 controls the moving unit 84 to move either one of the blade chucks 82 in a second direction 112 illustrated in FIG. 13 perpendicular to the central axis 821 and different from the first direction 111. According to the first embodiment, the second direction 112 is illustrated as a downward direction along the Z-axis direction. However, the present invention is not limited to such a direction.

Then, as illustrated in FIG. 13, the grippers 825 contact the outer circumferential surface of the boss 242 at a second contact point 122 different from the first contact point 121. The calculator 102 recognizes that the output signals from the vibration detecting sensors 28 exceed the threshold value 400 at time 402 in FIG. 3, recognizing that the grippers 825 have contacted the outer circumferential surface of the boss 242 at the second contact point 122, and stops moving the blade mounting/dismounting unit 80 of the moving unit 84. The calculator 102 calculates the position in the X-axis direction and the position in the Z-axis direction of the central axis 821 (hereinafter denoted by 821-2) at the time the grippers 825 have contacted the outer circumferential surface of the boss 242 at the second contact point 122 on the basis of the detection signals from the position detecting units at time 402 when the output signals from the vibration detecting sensors 28 exceed the threshold value 400, and temporarily stores the calculated positions in the storage device.

The calculator 102 controls the moving unit 84 to move either one of the blade chucks 82 in a third direction 113 (see FIG. 14) perpendicular to the central axis 821 and different from the first direction 111 and the second direction 112. According to the first embodiment, the third direction 113 is illustrated as a direction parallel to the X-axis direction. However, the present invention is not limited to such a direction.

Then, as illustrated in FIG. 14, the grippers 825 contact the outer circumferential surface of the boss 242 at a third contact point 123. The calculator 102 recognizes that the output signals from the vibration detecting sensors 28 exceed the threshold value 400 at time 403 in FIG. 3, recognizing that the grippers 825 have contacted the outer circumferential surface of the boss 242 at the third contact point 123, and stops moving the blade mounting/dismounting unit 80 of the moving unit 84. The third contact point 123 is different from both the first contact point 121 and the second contact point 122. The calculator 102 calculates the position in the X-axis direction and the position in the Z-axis direction of the central axis 821 (hereinafter denoted by 821-3) at the time the grippers 825 have contacted the outer circumferential surface of the boss 242 at the third contact point 123 on the basis of the detection signals from the position detecting units at time 403 when the output signals from the vibration detecting sensors 28 exceed the threshold value 400, and temporarily stores the calculated positions in the storage device.

On the basis of the positions in the X-axis direction and the positions in the Z-axis direction of the central axes 821-1, 821-2, and 821-3, the calculator 102 calculates the position in the X-axis direction and the position in the Z-axis direction of the center of a circle passing through the central axes 821-1, 821-2, and 821-3 as the position in the X-axis direction and the position in the Z-axis direction of the central axis 246 of the boss 242 of the mount 24 of the cutting unit 20, and stores the calculated positions as the position in the X-axis direction and the position in the Z-axis direction of the central axis 246 of the boss 242 of the mount 24 of a new cutting unit 20 in the storage device.

In this manner, in the position calculating operation for calculating the central axis 246 of the mount 24, the calculator 102 calculates the position in the X-axis direction and the position in the Z-axis direction of the central axis 246 of the boss 242 of the mount 24 from the positions in the X-axis direction and the positions in the Z-axis direction of the central axes 821-1, 821-2, and 821-3 as represented by the X coordinate and the Z coordinate at the time the grippers 825 contact the outer circumferential surface of the boss 242 of the mount 24 at the three contact points 121, 122, and 123 and the output signals from the vibration detecting sensors 28 exceed the threshold value 400 as they detect vibrations upon contact between the grippers 825 and the boss 242 of the mount 24, as illustrated in FIGS. 12, 13, and 14. According to the first embodiment, in the position calculating operation for calculating the central axis 246 of the mount 24, the calculator 102 brings the grippers 825 into contact with the outer circumferential surface of the boss 242 of the mount 24 at the three contact points 121, 122, and 123. According to the present invention, however, the grippers 825 may be brought into contact with the outer circumferential surface of the boss 242 of the mount 24 at at least the three contact points 121, 122, and 123.

Figure 15:
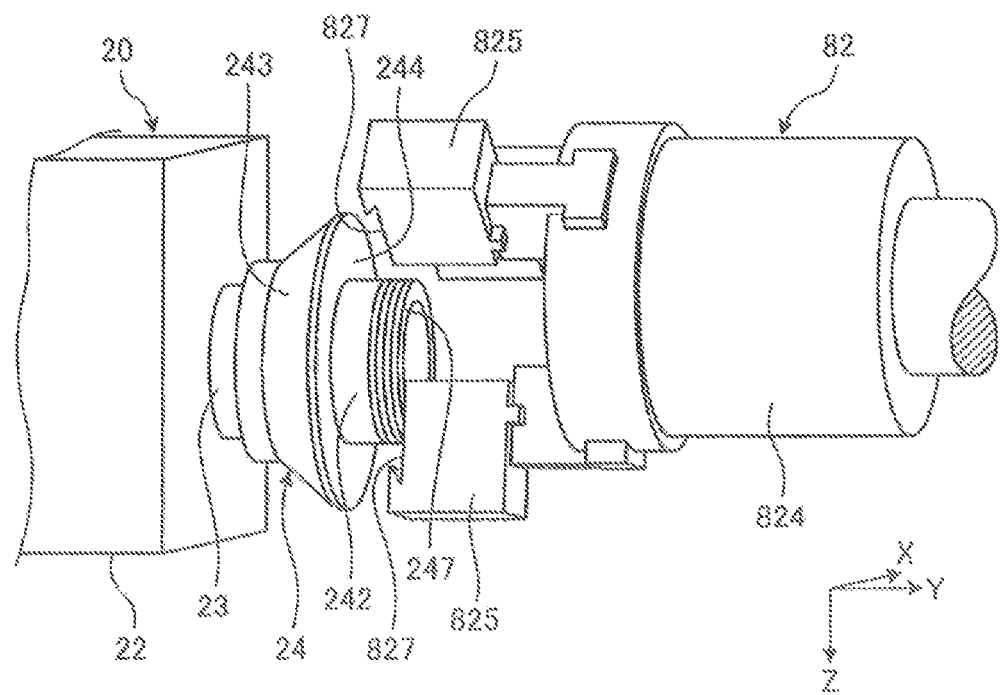
FIG. 15 is a perspective view illustrating the manner in which the grippers of the blade chuck and a distal end face of the boss are held in contact with each other in a position calculating operation for calculating the position of a distal end face of the mount of the processing apparatus illustrated in FIG. 1.
Figure 16:
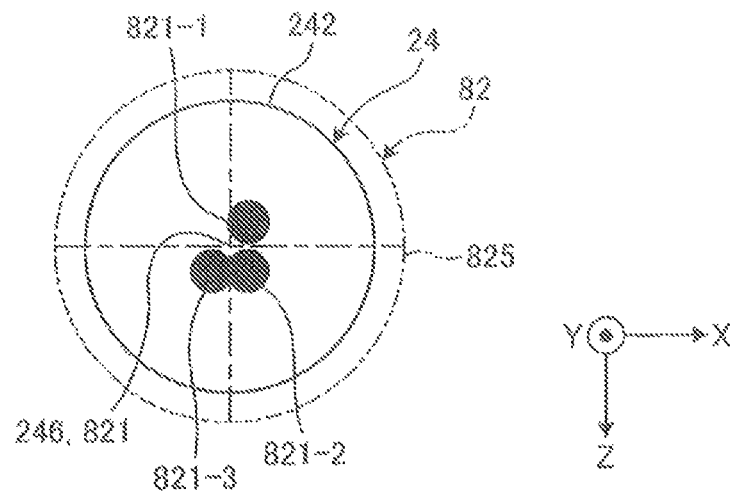
FIG. 16 is a view schematically illustrating the positional relationship between the grippers of the blade chuck and the boss in mounting or dismounting a blade on the basis of the position of the central axis of the mount that has been calculated by the position calculating operation for calculating the position of the mount of the processing apparatus illustrated in FIG. 1.

According to the first embodiment, in the position calculating operation for calculating the position of the mount, next, the calculator 102 of the control unit 100 carries out a position calculating operation for calculating the position of the distal end face 247 of the boss 242 of the mount 24 of the cutting unit 20 in the mounting/dismounting position. FIG. 15 illustrates in perspective the manner in which the grippers of the blade chuck and a distal end face of the boss are held in contact with each other in a position calculating operation for calculating the position of a distal end face of the mount of the processing apparatus illustrated in FIG. 1. FIG. 16 schematically illustrates the positional relationship between the grippers of the blade chuck and the boss in mounting or dismounting a blade on the basis of the position of the central axis of the mount that has been calculated by the position calculating operation for calculating the position of the mount of the processing apparatus illustrated in FIG. 1.

In the position calculating operation for calculating the position of the distal end face 247 of the boss 242 of the mount 24, the calculator 102 of the control unit 100 controls the moving unit 84 to move the unit body 81 of the blade mounting/dismounting unit 80 to position the one blade chuck 82 in a position where the flat surfaces 827 of the grippers 825 are juxtaposed in the Y-axis direction with the distal end face 247 of the boss 242 of the mount 24 of the cutting unit 20 from which the fastening nut 27 and the cutting blade 21 have been removed. While the grippers 825 of the one blade chuck 82 are being spaced from each other, the calculator 102 controls the moving unit 84 to bring the one blade chuck 82 along the Y-axis direction closely to the distal end face 247 of the boss 242 of the mount 24 of the cutting unit 20 from which the fastening nut 27 and the cutting blade 21 have been removed.

Then, as illustrated in FIG. 15, the flat surfaces 827 of the grippers 825 contact the distal end face 247 of the boss 242. The calculator 102 recognizes that the output signals from the vibration detecting sensors 28 exceed the threshold value 400, recognizing the flat surfaces 827 of the grippers 825 has contacted the distal end face 247 of the boss 242, and stops moving the blade mounting/dismounting unit 80 of the moving unit 84. The calculator 102 calculates the position in the Y-axis direction of the flat surfaces 827 at the time the flat surfaces 827 of the grippers 825 has contacted the distal end face 247 of the boss 242 on the basis of the detection signals from the position detecting units at the time when the output signals from the vibration detecting sensors 28 exceed the threshold value 400, and stores the calculated position as the position in the Y-axis direction of the distal end face 247 of the boss 242 of the mount 24 of a new cutting unit 20 in the storage device.

In the position calculating operation for calculating the position of the distal end face 247 of the boss 242 of the mount 24, the calculator 102 thus calculates the position in the Y-axis direction of the distal end face 247 of the boss 242 of the mount 24 from the position in the Y-axis direction of the flat surfaces 827 as represented by the Y coordinate at the time the grippers 825 contact the distal end face 247 of the boss 242 of the mount 24 at one contact point and the output signals from the vibration detecting sensors 28 exceed the threshold value 400 as they have detected vibrations upon contact between the grippers 825 and the distal end face 247. According to the first embodiment, in the position calculating operation for calculating the position of the distal end face 247 of the boss 242 of the mount 24, the calculator 102 brings the grippers 825 into contact with the distal end face 247 of the boss 242 of the mount 24 at one contact point. According to the present invention, the grippers 825 may be brought into contact with the distal end face 247 of the boss 242 of the mount 24 at at least one contact point. The mounting/dismounting controller 103 of the control unit 100 controls the blade mounting/dismounting unit 80 to align the central axis 821 of the blade chuck 82 with the central axis 246 of the mount 24, as illustrated in FIG. 16, on the basis of the calculated position in the X-axis direction and the calculated position in the Z-axis direction of the central axis 246 and the position in the Y-axis direction of the distal end face 247 of the boss 242, whereupon cutting blades 21 are dismounted and mounted. In FIG. 16, the outer circumferential surface of the boss 242 is schematically indicated by a solid-line circle, whereas a circle inscribed in the grippers 825 is schematically indicated by a two-dot-dash-line circle.

In the processing apparatus 1 according to the first embodiment described above, the mount 24 of the spindle 23 has the vibration detecting sensors 28, and the processing apparatus 1 grasps the positions where the grippers 825 of the blade chuck 82 and the mount 24 contact each other on the basis of the output signals from the vibration detecting sensors 28 and the detection results from the position detecting units. As a result, the blade changer unit 7 according to the first embodiment is able to determine with ease the position of the mount 24 on which a cutting blade 21 is mounted.

Furthermore, the processing apparatus 1 according to the first embodiment can easily determine the position in the X-axis direction and the position in the Z-axis direction of the central axis 246 of the boss 242 of the mount 24 of the cutting unit 20 in the mounting/dismounting position as it brings the grippers 825 of the blade chuck 82 into contact with the outer circumferential surface of the boss 242 of the mount 24 of the cutting unit 20 in the mounting/dismounting position at at least the three contact points 121, 122, and 123.

Moreover, the processing apparatus 1 according to the first embodiment can easily determine the position in the Y-axis direction of the distal end face 247 of the boss 242 of the mount 24 of the cutting unit 20 in the mounting/dismounting position as it brings the grippers 825 of the blade chuck 82 into contact with the distal end face 247 of the boss 242 of the mount 24 of the cutting unit 20 in the mounting/dismounting position at at least one contact point.

Furthermore, the processing apparatus 1 according to the first embodiment can easily determine the position of the mount 24 on which a cutting blade 21 is mounted because the contact between the grippers 825 of the blade chuck 82 and the mount 24 is recognized from the output signals from the vibration detecting sensors 28 that the mount 24 of the spindle 23 has, rather than being detected by way of contact-induced conduction, and with the grippers 825 not made of an electrically conductive material.

[First Modification]

Figure 17:
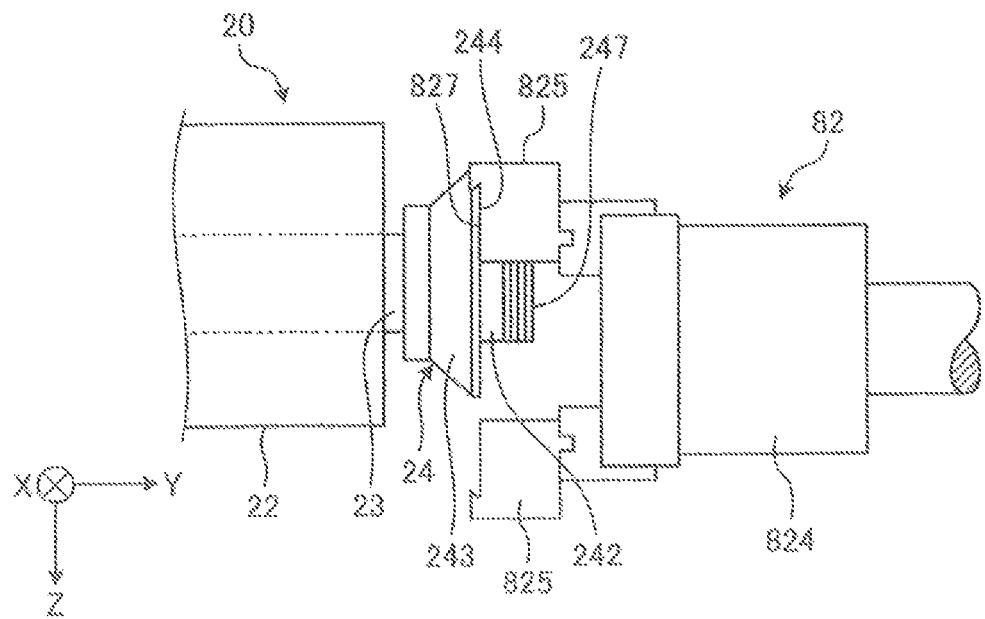
FIG. 17 is a side elevational view illustrating the manner in which grippers of a blade chuck and a bearing flange of a mount are held in contact with each other in a position calculating operation for calculating the position of a distal end face of the mount of a processing apparatus according to a first modification of the first embodiment.

A processing apparatus according to a first modification of the first embodiment will hereinafter be described below with reference to the drawings. FIG. 17 illustrates in side elevation the manner in which grippers of a blade chuck and a bearing flange of a mount are held in contact with each other in a position calculating operation for calculating the position of a distal end face of the mount of the processing apparatus according to the first modification of the first embodiment. Those parts of the processing apparatus according to the first modification which are identical to those of the processing apparatus according to the first embodiment are denoted by identical reference characters in FIG. 17, and will not be described in detail below.

The processing apparatus, denoted by 1, according to the first modification of the first embodiment is the same as the processing apparatus 1 according to the first embodiment except that a position calculating operation for calculating the position of the distal end face 247 of the boss 242 of the mount 24 in a position calculating operation for calculating the position of the mount 24 is different from the position calculating operation according to the first embodiment. In the position calculating operation for calculating the position of the distal end face 247 of the boss 242 of the mount 24 in the position calculating operation for calculating the position of the mount 24, the processing apparatus 1 according to the first modification of the first embodiment brings the flat surfaces 827 of the grippers 825 of the blade chuck 82 into contact with the outer edge portion 244 of the distal end of the bearing flange 243 of the mount 24 of the cutting unit 20 in the mounting/dismounting position, calculates the position in the Y-axis direction of the outer edge portion 244 of the bearing flange 243, and calculates the position in the Y-axis direction of the distal end face 247 of the boss 242.

In the processing apparatus 1 according to the first modification of the first embodiment, as with the first embodiment, the mount 24 of the spindle 23 has the vibration detecting sensors 28, and the processing apparatus 1 grasps the positions where the grippers 825 of the blade chuck 82 and the mount 24 contact each other on the basis of the output signals from the vibration detecting sensors 28 and the detection results from the position detecting units. As a result, the processing apparatus 1 according to the first modification of the first embodiment is able to determine with ease the position of the mount 24 on which a cutting blade 21 is mounted, as with the first embodiment.

[Second Modification]

Figure 18:
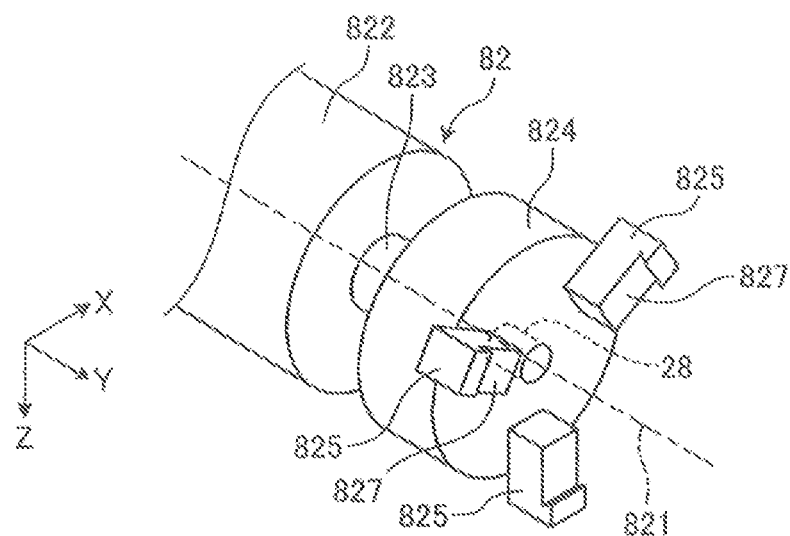
FIG. 18 is a perspective view illustrating by way of example the structure of a blade chuck of a blade mounting/dismounting unit of a blade changer unit of a processing apparatus according to a second modification of the first embodiment.

A processing apparatus according to a second modification of the first embodiment will hereinafter be described below with reference to the drawings. FIG. 18 illustrates in perspective by way of example the structure of a blade chuck of a blade mounting/dismounting unit of a blade changer unit of the processing apparatus according to the second modification of the first embodiment. Those parts of the processing apparatus according to the second modification which are identical to those of the processing apparatus according to the first embodiment are denoted by identical reference characters in FIG. 18, and will not be described in detail below.

As illustrated in FIG. 18, the processing apparatus, denoted by 1, according to the second modification of the first embodiment is the same as the processing apparatus 1 according to the first embodiment except that the blade chuck 82 of the blade mounting/dismounting unit 80 of the blade changer unit 7 has a vibration detecting sensor 28. According to the second modification, the vibration detecting sensor 28 is embedded centrally in the support base 824.

The processing apparatus 1 according to the second modification of the first embodiment, as with the first embodiment, includes the blade mounting/dismounting unit 80 having the blade chucks 82 each having the vibration detecting sensor 28, and grasps the positions where the grippers 825 of the blade chuck 82 and the mount 24 contact each other on the basis of the output signals from the vibration detecting sensor 28 and the detection results from the position detecting units. As a result, the processing apparatus 1 according to the second modification of the first embodiment is able to determine with ease the position of the mount 24 on which a cutting blade 21 is mounted, as with the first embodiment.

According to the present invention, the grippers 835 of the nut holder 83 may be brought into contact with the mount 24, as with the first embodiment, the first modification, and the second modification, and the position referred to above of the mount 24 may be calculated. In this case, it is desirable that the nut holder 83 may have a vibration detecting sensor 28.

[Third Modification]

Figure 19:
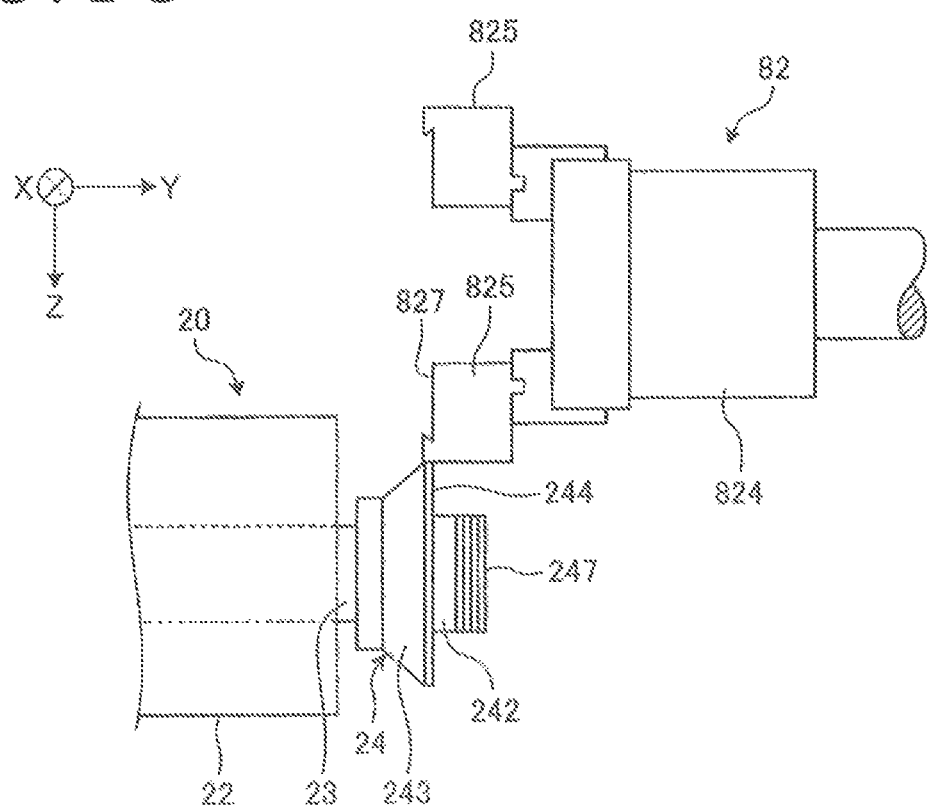
FIG. 19 is a side elevational view illustrating the manner in which grippers of a blade chuck and the outer edge of a bearing flange of a mount are held in contact with each other in a position calculating operation for calculating the position of the central axis of the mount of a processing apparatus according to a third modification of the first embodiment.

A processing apparatus according to a third modification of the first embodiment will hereinafter be described below with reference to the drawings. FIG. 19 illustrates in side elevation the manner in which grippers of a blade chuck and the outer edge of a bearing flange of a mount are held in contact with each other in a position calculating operation for calculating the position of the central axis of the mount of the processing apparatus according to the third modification of the first embodiment. Those parts of the processing apparatus according to the third modification which are identical to those of the processing apparatus according to the first embodiment are denoted by identical reference characters in FIG. 19, and will not be described in detail below.

The processing apparatus, denoted by 1, according to the third modification of the first embodiment is the same as the processing apparatus 1 according to the first embodiment except that in the position calculating operation for calculating the position of the central axis 246 of the mount 24 in the position calculating operation for calculating the position of the mount 24, the processing apparatus 1 calculates the position in the X-axis direction and the position in the Z-axis direction of the central axis 246 of the mount 24 from the position in the X-axis direction as represented by the X coordinate, and the position in the Z-axis direction as represented by the Z coordinate, that are detected by the position detecting units at the time the moving unit 84 is controlled to move the mount 24 and the blade chucks 82 relatively to each other in the X-axis direction and the Z-axis direction to bring the outer edge of the bearing flange 243 of the mount 24 and the grippers 825 of the blade chuck 82 into contact with each other at at least three contact points, and the output signals from the vibration detecting sensors 28 exceed the threshold value 400 as they have detected vibrations upon contact between the outer edge of the bearing flange 243 and the grippers 825 of the blade chuck 82.

In the processing apparatus 1 according to the third modification of the first embodiment, as with the first embodiment, the mount 24 of the spindle 23 has the vibration detecting sensors 28, and the processing apparatus 1 brings the grippers 825 of the blade chuck 82 into contact with the bearing flange 243 of the mount 24, and grasps the positions where the grippers 825 of the blade chuck 82 contact the bearing flange 243 of the mount 24 on the basis of the output signals from the vibration detecting sensor 28 and the detection results from the position detecting units. As a result, the processing apparatus 1 according to the third modification of the first embodiment is able to determine with ease the central positions in the X-axis direction and the Z-axis direction of the mount 24 on which a cutting blade 21 is mounted, as with the first embodiment.

Second Embodiment

Figure 20:
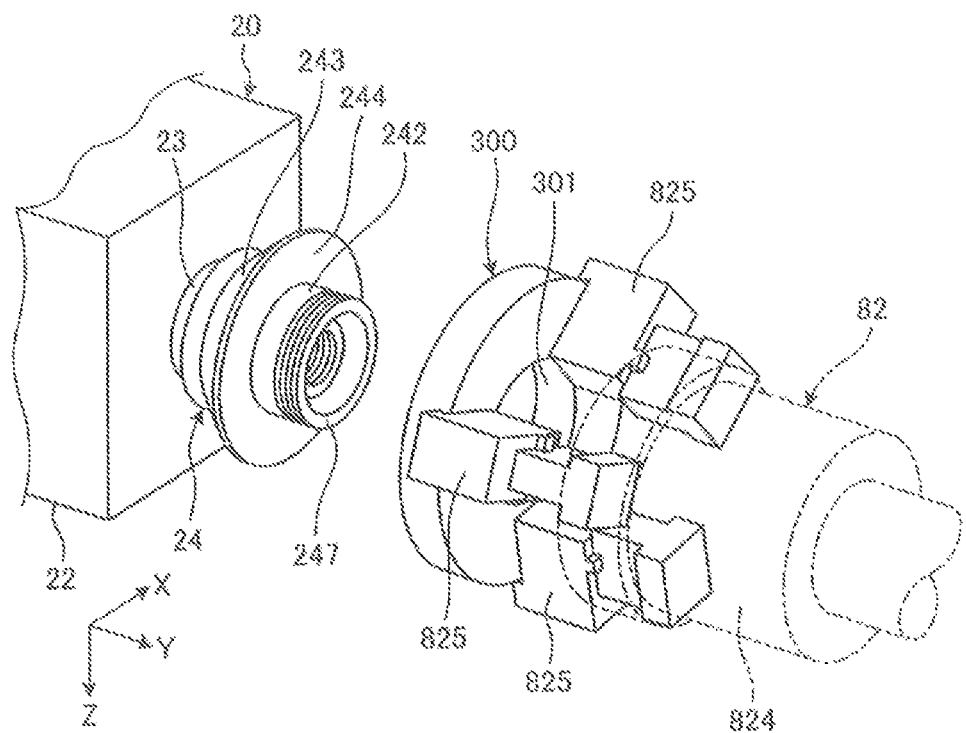
FIG. 20 is a perspective view illustrating the manner in which grippers of a blade chuck hold a jig in a position calculating operation for calculating the position of a mount of a processing apparatus according to a second embodiment of the present invention.
Figure 21:
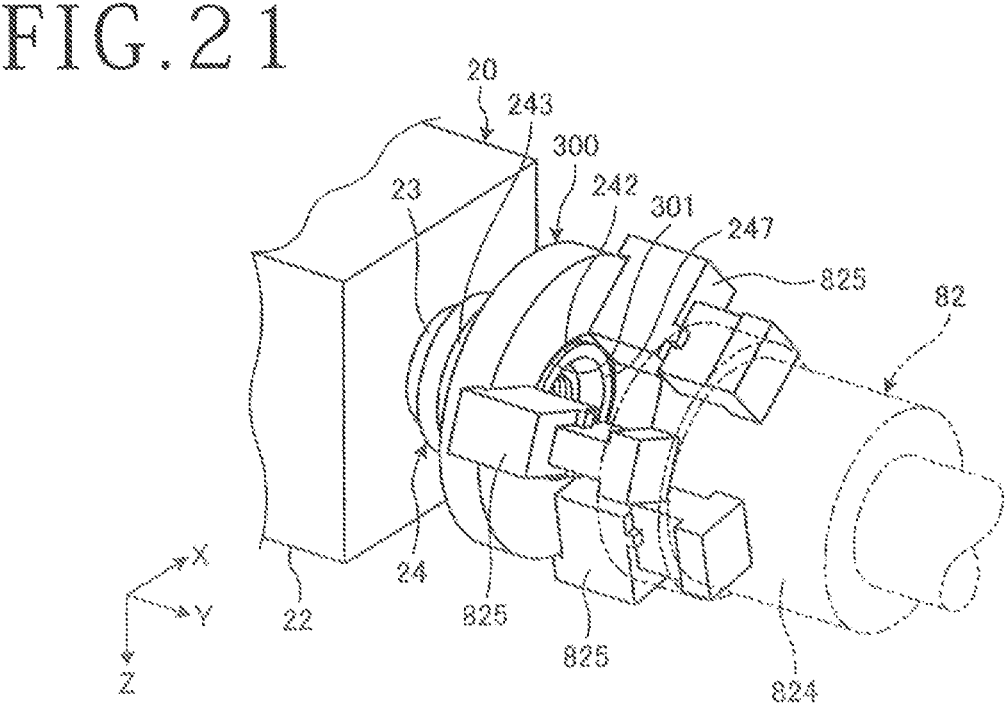
FIG. 21 is a perspective view illustrating the manner in which a boss is inserted into an opening in the jig in the position calculating operation for calculating the position of the central axis of the mount of the processing apparatus according to the second embodiment.
Figure 22:
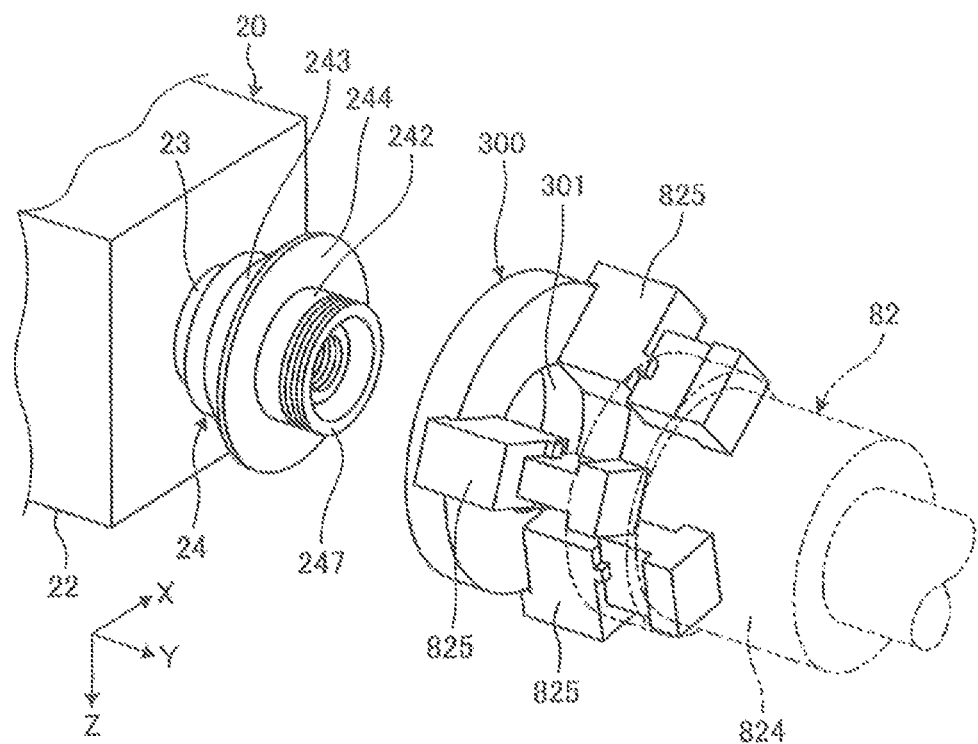
FIG. 22 is another perspective view illustrating the manner in which the boss is inserted into the opening in the jig in the position calculating operation for calculating the position of the central axis of the mount of the processing apparatus according to the second embodiment.
Figure 23:
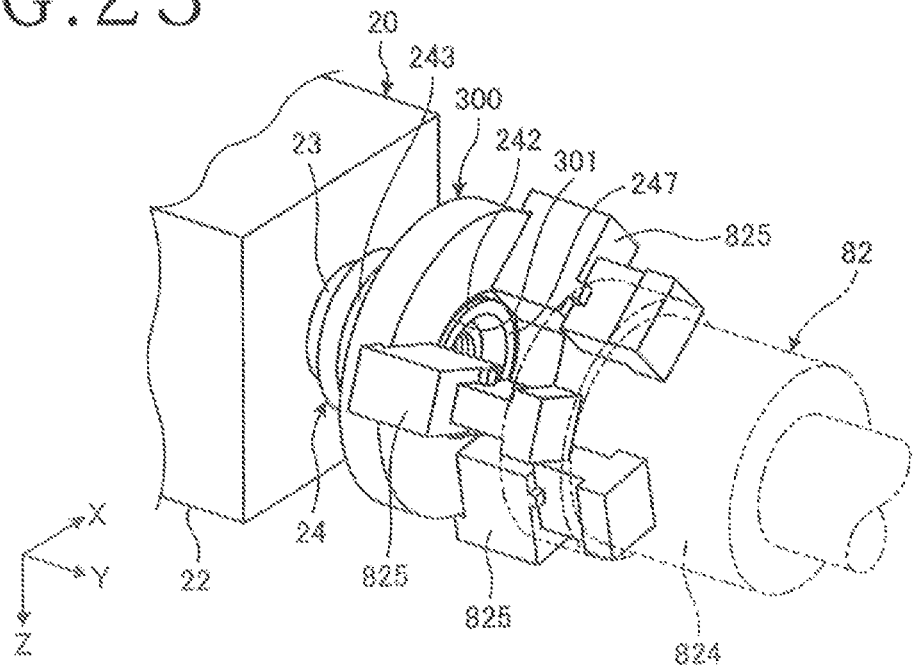
FIG. 23 is a view schematically illustrating the manner in which an inner circumferential surface of the jig that defines the opening is held in contact with an outer circumferential surface of the boss at a first contact point in the position calculating operation for calculating the position of the central axis of the mount of the processing apparatus according to the second embodiment.
Figure 24:
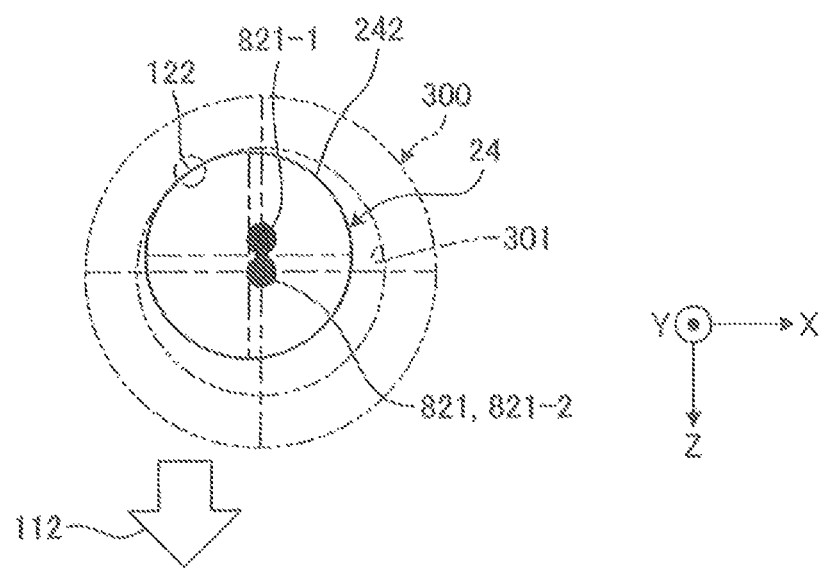
FIG. 24 is a view schematically illustrating the manner in which an inner circumferential surface of the jig that defines the opening is held in contact with an outer circumferential surface of the boss at a second contact point in the position calculating operation for calculating the position of the central axis of the mount of the processing apparatus according to the second embodiment.
Figure 25:
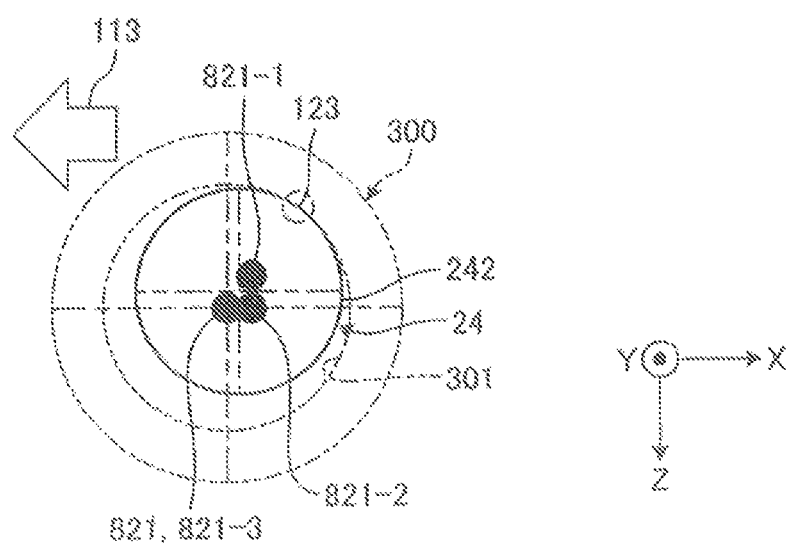
FIG. 25 is a view schematically illustrating the manner in which an inner circumferential surface of the jig that defines the opening is held in contact with an outer circumferential surface of the boss at a third contact point in the position calculating operation for calculating the position of the central axis of the mount of the processing apparatus according to the second embodiment.
Figure 26:
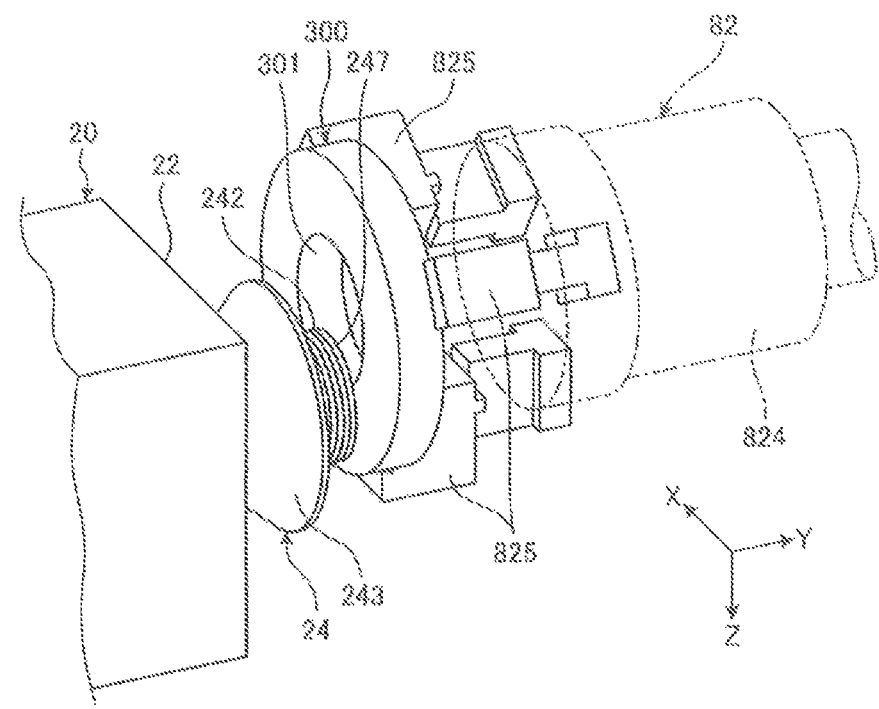
FIG. 26 is a perspective view illustrating the manner in which the jig and a distal end face of the boss are held in contact with each other in a position calculating operation for calculating the position of a distal end face of the mount of the processing apparatus according to the second embodiment.

A processing apparatus according to a second embodiment of the present invention will be described below with reference to the drawings. FIG. 20 illustrates in perspective the manner in which grippers of a blade chuck holds a jig in a position calculating operation for calculating the position of the central axis of a mount of the processing apparatus according to the second embodiment. FIG. 21 illustrates in perspective the manner in which a boss is inserted into an opening in the jig in the position calculating operation for calculating the position of the central axis of the mount of the processing apparatus according to the second embodiment. FIG. 22 illustrates in perspective another manner in which the boss is inserted into the opening in the jig in the position calculating operation for calculating the position of the central axis of the mount of the processing apparatus according to the second embodiment. FIG. 23 schematically illustrates the manner in which an edge of the jig that defines the opening is held in contact with an outer circumferential surface of the boss at a first contact point in the position calculating operation for calculating the position of the central axis of the mount of the processing apparatus according to the second embodiment. FIG. 24 schematically illustrates the manner in which the edge of the jig that defines the opening is held in contact with the outer circumferential surface of the boss at a second contact point in the position calculating operation for calculating the position of the central axis of the mount of the processing apparatus according to the second embodiment. FIG. 25 schematically illustrates the manner in which the edge of the jig that defines the opening is held in contact with the outer circumferential surface of the boss at a third contact point in the position calculating operation for calculating the position of the central axis of the mount of the processing apparatus according to the second embodiment. FIG. 26 illustrates in perspective the manner in which the jig and a distal end face of the boss are held in contact with each other in a position calculating operation for calculating the position of a distal end face of the mount of the processing apparatus according to the second embodiment. In FIGS. 20 through 26, those parts that are identical to those according to the first embodiment are denoted by identical reference characters, and will not be described in detail below.

The processing apparatus, denoted by 1, according to the second embodiment is the same as the processing apparatus 1 according to the first embodiment except that in a position calculating operation for calculating the position of the mount 24, the grippers 825 of the blade chuck 82 hold a jig 300 and bring the jig 300 into contact with the outer circumferential surface and the distal end face 247 of the boss 242, as illustrated in FIG. 20.

In the position calculating operation for calculating the position of the mount 24, the processing apparatus 1 according to the second embodiment causes the blade chuck 82 which is not gripping the cutting blade 21 removed from the cutting unit 20 to hold the jig 300, as illustrated in FIG. 20. The jig 300 is of an annular shape with an opening 301 larger than the boss 242, defined centrally therein. According to the second embodiment, the opening 301 has an inside diameter larger than the outside diameter of the boss 242.

According to the second embodiment, in the position calculating operation for calculating the central axis 246 of the mount 24 of the cutting unit 20 in the mounting/dismounting position, the calculator 102 of the control unit 100 controls the moving unit 84 to move the mount 24 and the jig 300 held by the blade chuck 82 relatively to each other in the X-axis direction and the Z-axis direction to bring them into contact with each other at at least three contact points, and calculates the position in the X-axis direction and the position in the Z-axis direction of the central axis 246 of the mount 24 from the position in the X-axis direction as represented by the X coordinate and the position in the Z-axis direction as represented by the Z coordinate detected by the position detecting units at the time the output signals from the vibration detecting sensors 28 exceed the threshold value 400 as they detect vibrations upon contact between the mount 24 and the jig 300.

Furthermore, the calculator 102 controls the moving unit 84 to bring the jig 300 held by the grippers 825 of the blade chuck 82 into contact with the distal end face 247 of the boss 242 of the mount 24 at at least one contact point, and calculates the position in the Y-axis direction of the distal end face 247 of the boss 242 of the mount 24 from the position in the Y-axis direction as represented by the Y coordinate detected by the position detecting units at the time the output signals from the vibration detecting sensors 28 exceed the threshold value 400 as they detect vibrations upon contact between the jig 300 and the distal end face 247.

According to the second embodiment, in the position calculating operation to calculate the position of the central axis 246 of the mount 24 of the cutting unit 20 in the mounting/dismounting position, the calculator 102 of the control unit 100 controls the moving unit 84 to move unit body 81 of the blade mounting/dismounting unit 80 to position the blade chuck 82 holding the jig 300 in a position where the blade chuck 82 is juxtaposed in the Y-axis direction with the boss 242 of the mount 24 of the cutting unit 20 from which the fastening nut 27 and the cutting blade 21 have been removed. At this time, the calculator 102 positions the cutting unit 20 and the blade chuck 82 in a position where they are coaxial with each other on the basis of the position in the X-axis direction and the position in the Z-axis direction of the central axis 246 in the mounting/dismounting position stored in the storage device. The calculator 102 controls the moving unit 84 to bring the blade chuck 82 gripping the jig 300 closely to the cutting unit 20 along the Y-axis direction, insert the boss 242 into the opening 301 in the jig 300, as illustrated in FIG. 21, and stop the blade chuck 82 in a position where the mount 24 and the jig 300 are spaced from each other and kept out of contact with each other.

The calculator 102 controls the moving unit 84 to move the blade chuck 82 gripping the jig 300 successively in the first direction 111, the second direction 112, and the third direction 113, that are perpendicular to the central axis 821, in the same manner as with the first embodiment, as illustrated in FIG. 22.

When the calculator 102 controls the moving unit 84 to move the blade chuck 82 in the first direction 111, as illustrated in FIG. 23, an inner circumferential surface of the jig 300 that defines the opening 301 contacts the outer circumferential surface of the boss 242 at the first contact point 121. As with the first embodiment, the calculator 102 calculates the position in the X-axis direction and the position in the Z-axis direction of the central axis 821-1 at the time the inner circumferential surface of the jig 300 that defines the opening 301 has contacted the outer circumferential surface of the boss 242 at the first contact point 121, and temporarily stores the calculated positions in the storage device. In FIGS. 23, 24, and 25, the outer circumferential surface of the boss 242 is schematically indicated by a solid-line circle, whereas an outer profile of the jig 300 is schematically indicated by two-dot-dash-line circles.

The calculator 102 controls the moving unit 84 to move the blade chuck 82 gripping the jig 300 in the second direction 112. Then, as illustrated in FIG. 24, the inner circumferential surface of the jig 300 that defines the opening 301 contacts the outer circumferential surface of the boss 242 at the second contact point 122. As with the first embodiment, the calculator 102 calculates the position in the X-axis direction and the position in the Z-axis direction of the central axis 821-2 at the time the inner circumferential surface of the jig 300 that defines the opening 301 has contacted the outer circumferential surface of the boss 242 at the second contact point 122, and temporarily stores the calculated positions in the storage device.

The calculator 102 controls the moving unit 84 to move the blade chuck 82 gripping the jig 300 in the third direction 113. Then, as illustrated in FIG. 25, the inner circumferential surface of the jig 300 that defines the opening 301 contacts the outer circumferential surface of the boss 242 at the third contact point 123. As with the first embodiment, the calculator 102 calculates the position in the X-axis direction and the position in the Z-axis direction of the central axis 821-3 at the time the inner circumferential surface of the jig 300 that defines the opening 301 has contacted the outer circumferential surface of the boss 242 at the third contact point 123, and temporarily stores the calculated positions in the storage device.

As with the first embodiment, the calculator 102 calculates the position in the X-axis direction and the position in the Z-axis direction of the center of a circle passing through the central axes 821-1, 821-2, and 821-3 as the position in the X-axis direction and the position in the Z-axis direction of the central axis 246 of the boss 242 of the mount 24 of the cutting unit 20, and stores the calculated positions as the position in the X-axis direction and the position in the Z-axis direction of the central axis 246 of the boss 242 of the mount 24 of a new cutting unit 20 in the storage device. In this manner, in the position calculating operation for calculating the central axis 246 of the mount 24, the calculator 102 calculates the position in the X-axis direction and the position in the Z-axis direction of the central axis 246 of the boss 242 of the mount 24 from the positions in the X-axis direction and the positions in the Z-axis direction of the central axes 821-1, 821-2, and 821-3 as represented by the X coordinates and the Z coordinates at the time the jig 300 contacts the outer circumferential surface of the boss 242 of the mount 24 at the three contact points 121, 122, and 123 and the output signals from the vibration detecting sensors 28 exceed the threshold value 400 as they detect vibrations upon contact between the jig 300 and the boss 242 of the mount 24, as illustrated in FIGS. 23, 24, and 25. According to the second embodiment, in the position calculating operation for calculating the central axis 246 of the mount 24, the calculator 102 brings the jig 300 into contact with the outer circumferential surface of the boss 242 of the mount 24 at the three contact points 121, 122, and 123. According to the present invention, however, the jig 300 may be brought into contact with the outer circumferential surface of the boss 242 of the mount 24 at at least three contact points.

According to the second embodiment, in the position calculating operation for calculating the position of the distal end face 247 of the boss 242 of the mount 24 of the cutting unit 20 in the mounting/dismounting position, the calculator 102 of the control unit 100 controls the moving unit 84 to move the unit body 81 of the blade mounting/dismounting unit 80 to position the blade chuck 82 gripping the jig 300 in a position where the jig 300 is juxtaposed in the Y-axis direction with the distal end face 247 of the boss 242 of the mount 24 of the cutting unit 20 from which the fastening nut 27 and the cutting blade 21 have been removed.

The calculator 102 controls the moving unit 84 to bring the blade chuck 82 gripping the jig 300 along the Y-axis direction closely to the distal end face 247 of the boss 242 of the mount 24 of the cutting unit 20 from which the fastening nut 27 and the cutting blade 21 have been removed.

Then, as illustrated in FIG. 26, the jig 300 contacts the distal end face 247 of the boss 242. As with the first embodiment, the calculator 102 calculates the position in the Y-axis direction of the distal end face 247 of the boss 242 of the mount 24 of a new cutting unit 20, and stores the calculated position in the storage device. In the position calculating operation for calculating the position of the distal end face 247 of the boss 242 of the mount 24, the calculator 102 thus calculates the position in the Y-axis direction of the distal end face 247 of the boss 242 of the mount 24 from the position in the Y-axis direction as represented by the Y coordinate at the time the jig 300 contacts the distal end face 247 of the boss 242 of the mount 24 at one contact point and the output signals from the vibration detecting sensors 28 exceed the threshold value 400 as they detect vibrations upon contact between the jig 300 and the boss 242 of the mount 24.

According to the second embodiment, in the position calculating operation for calculating the position of the distal end face 247 of the boss 242 of the mount 24, the calculator 102 brings the jig 300 into contact with the distal end face 247 of the boss 242 of the mount 24 at one contact point. According to the present invention, the jig 300 may be brought into contact with the distal end face 247 of the boss 242 of the mount 24 at at least one contact point. Then, the mounting/dismounting controller 103 of the control unit 100 controls the blade mounting/dismounting unit 80 to align the central axis 821 of the blade chuck 82 with the central axis 246 of the mount 24 on the basis of the calculated position in the X-axis direction and the calculated position in the Z-axis direction of the central axis 246 and the position in the Y-axis direction of the distal end face 247 of the boss 242, whereupon cutting blades 21 are dismounted and mounted.

In the processing apparatus 1 according to the second embodiment, as with the first embodiment, the mount 24 of the spindle 23 has the vibration detecting sensors 28, and the processing apparatus 1 grasps the position where the jig 300 held by the grippers 825 of the blade chuck 82 and the mount 24 contact each other on the basis of the output signals from the vibration detecting sensors 28 and the detection results from the position detecting units. As a result, the processing apparatus 1 according to the second embodiment is able to determine with ease the position of the mount 24 on which a cutting blade 21 is mounted.

[First Modification]

Figure 27:
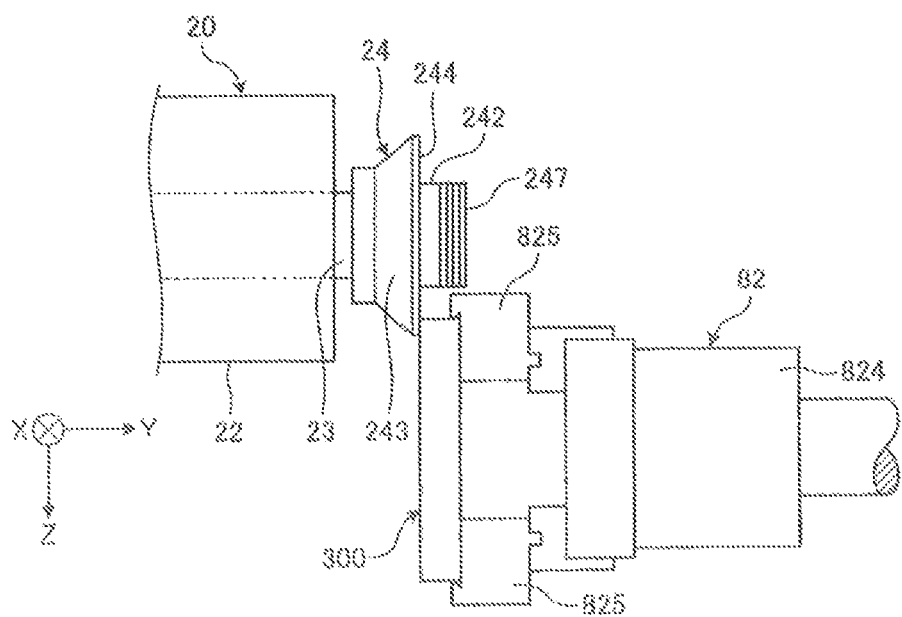
FIG. 27 is a side elevational view illustrating the manner in which a jig gripped by a blade chuck and a bearing flange of a mount are held in contact with each other in a position calculating operation for calculating the position of a distal end face of the mount of a processing apparatus according to a first modification of the second embodiment.

A processing apparatus according to a first modification of the second embodiment will hereinafter be described below with reference to the drawings. FIG. 27 illustrates in side elevation the manner in which a jig gripped by a blade chuck and a bearing flange of a mount are held in contact with each other in a position calculating operation for calculating the position of a distal end face of the mount of the processing apparatus according to the first modification of the second embodiment. In FIG. 27, those parts of the processing apparatus according to the first modification which are identical to those of the processing apparatus according to the second embodiment are denoted by identical reference characters, and will not be described in detail below.

The processing apparatus, denoted by 1, according to the first modification of the second embodiment is the same as the processing apparatus 1 according to the second embodiment except that a position calculating operation for calculating the position of the distal end face 247 of the boss 242 of the mount 24 in a position calculating operation for calculating the position of the mount 24 is different from the position calculating operation according to the second embodiment. In the position calculating operation for calculating the position of the distal end face 247 of the boss 242 of the mount 24 in the position calculating operation for calculating the position of the mount 24, the processing apparatus 1 according to the first modification of the second embodiment brings the jig 300 gripped by the grippers 825 of the blade chuck 82 into contact with the outer edge portion 244 of the bearing flange 243 of the mount 24 of the cutting unit 20 in the mounting/dismounting position, calculates the position in the Y-axis direction of the outer edge portion 244 of the bearing flange 243, and calculates the position in the Y-axis direction of the distal end face 247 of the boss 242.

In the processing apparatus 1 according to the first modification of the second embodiment, as with the second embodiment, the mount 24 of the spindle 23 has the vibration detecting sensors 28, and the processing apparatus 1 grasps the position where the jig 300 gripped by the grippers 825 of the blade chuck 82 and the mount 24 contact each other on the basis of the output signals from the vibration detecting sensors 28 and the detection signals from the position detecting units. As a result, the blade changer unit 7 according to the first modification of the second embodiment, as with the second embodiment, is able to determine with ease the position of the mount 24 on which a cutting blade 21 is mounted.

[Second Modification]

Figure 28:
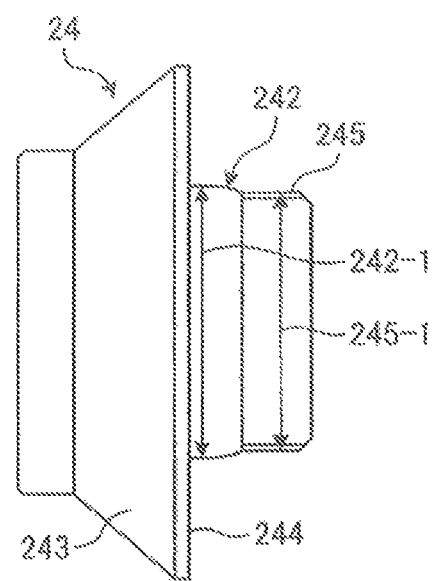
FIG. 28 is a side elevational view of a mount of a processing apparatus according to a second modification of the second embodiment.
Figure 29:
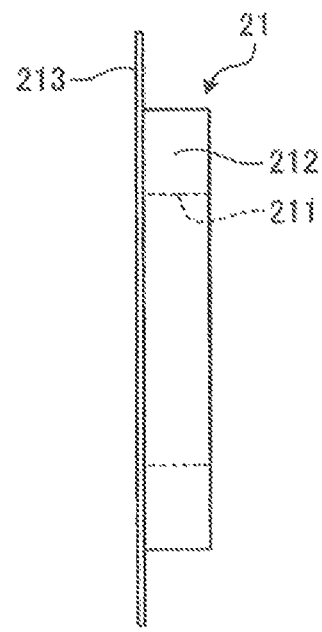
FIG. 29 is a side elevational view of a cutting blade of the processing apparatus according to the second modification of the second embodiment.
Figure 30:
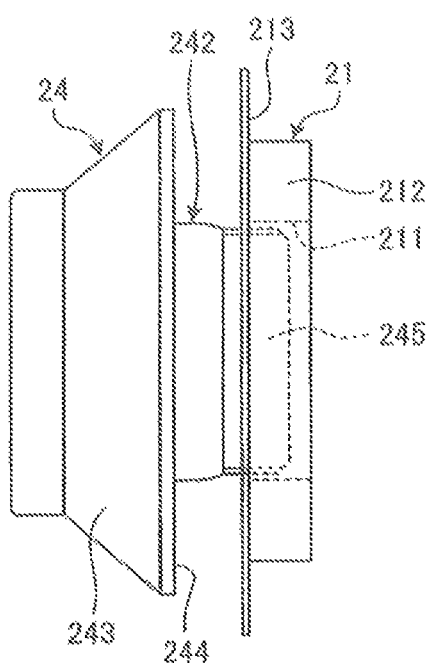
FIG. 30 is a side elevational view illustrating the manner in which a boss of the mount of the processing apparatus according to the second modification of the second embodiment is inserted in an insertion hole in the cutting blade.

A processing apparatus 1 according to a second modification of the second embodiment will hereinafter be described below with reference to the drawings. FIG. 28 illustrates in side elevation a mount of the processing apparatus according to the second modification of the second embodiment. FIG. 29 illustrates in side elevation a cutting blade of the processing apparatus according to the second modification of the second embodiment. FIG. 30 illustrates in side elevation the manner in which a boss of the mount of the cutting apparatus according to the second modification of the second embodiment is inserted in an insertion hole in the cutting blade. In FIGS. 28, 29, and 30, those parts of the processing apparatus according to the second modification which are identical to those of the processing apparatus according to the second embodiment are denoted by identical reference characters, and will not be described in detail below.

The processing apparatus 1 according to the second modification of the second embodiment is the same as the processing apparatus 1 according to the second embodiment except that the cutting blade 21 as the jig 300 is gripped by the blade chuck 82 while the position detecting operation for detecting the position of the mount 24 is carried out, and the externally threaded outer circumferential surface 245 of the boss 242 of the mount 24 has an outside diameter 245-1 smaller than an outside diameter 242-1 of an end of the boss 242, as illustrated in FIG. 28.

According to the second modification of the second embodiment, the insertion hole 211 in the cutting blade 21 illustrated in FIG. 29 has an inside diameter substantially equal to the outside diameter 242-1 of the end of the boss 242 of the mount 24 and larger than the outside diameter 245-1 of the externally threaded outer circumferential surface 245 of the boss 242. According to the second modification of the second embodiment, in the position calculating operation for calculating the position of the central axis 246 of the boss 242 of the mount 24 in the position calculating operation for calculating the position of the mount 24, as illustrated in FIG. 30, the externally threaded outer circumferential surface 245 of the boss 242 of the mount 24 is inserted into the insertion hole 211 in the cutting blade 21 without contacting the inner circumferential surface of the cutting blade 21 that defines the insertion hole 211. Thereafter, as with the second embodiment, the cutting blade 21 is moved successively in the first direction 111, the second direction 112, and the third direction 113, and the position in the X-axis direction and the position in the Z-axis direction of the central axis 246 of the boss 242 are calculated.

Furthermore, according to the second modification of the second embodiment, in the position calculating operation for calculating the position of the distal end face 247 of the boss 242 of the mount 24 in the position calculating operation for calculating the position of the mount 24, the circular base 212 of the cutting blade 21, etc. is brought into contact with the distal end face 247 of the boss 242 or the outer edge portion 244 of the bearing flange 243, and the positions in the X-, Z-, and Y-axis directions of the distal end face 247 of the boss 242 are calculated.

In the processing apparatus 1 according to the second modification of the second embodiment, as with the second embodiment, the mount 24 of the spindle 23 has the vibration detecting sensors 28, and the processing apparatus 1 grasps the position where the cutting blade 21 gripped by the grippers 825 of the blade chuck 82 and the mount 24 contact each other on the basis of the output signals from the vibration detecting sensors 28 and the detection signals from the position detecting units. As a result, the processing apparatus 1 according to the second modification of the second embodiment, as with the first embodiment, is able to determine with ease the position of the mount 24 on which a cutting blade 21 is mounted.

Furthermore, since the processing apparatus 1 according to the second modification of the second embodiment determines the position of the mount 24 by bringing the cutting blade 21 gripped by the grippers 825 into contact with the mount 24, the position of the mount 24 can be determined without using the dedicated jig 300, and the position of the mount 24 can be determined while cutting blades 21 are being dismounted and mounted.

Moreover, as the processing apparatus 1 according to the second modification of the second embodiment determines the position of the mount 24 by bringing the cutting blade 21 for use in cutting operations that is gripped by the grippers 825 into contact with the mount 24, the processing apparatus 1 is able to determine the position of the mount 24 with higher accuracy.

[Third Modification]

Figure 31:
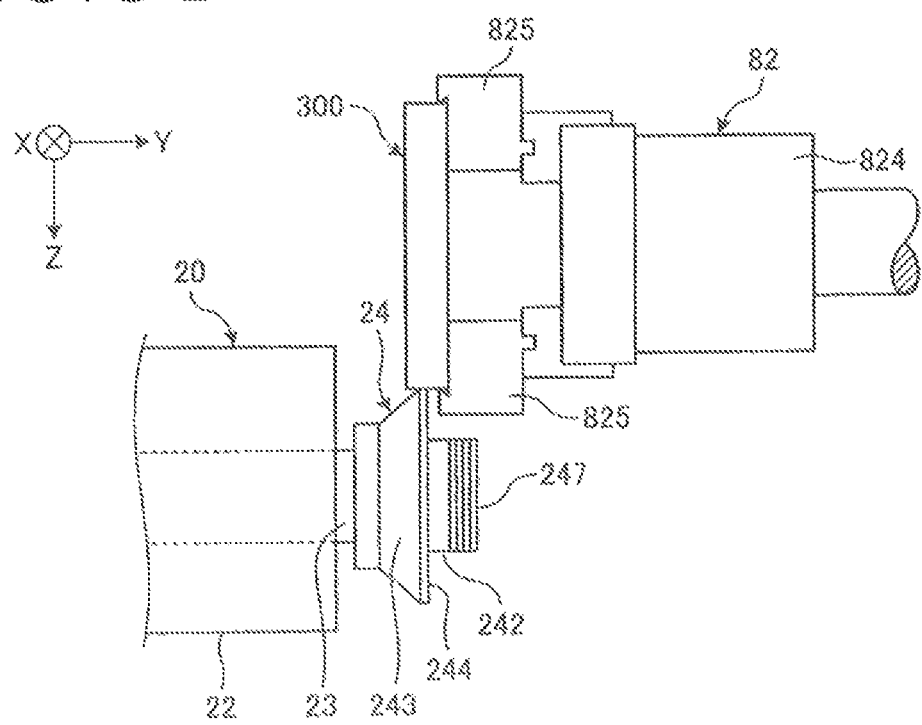
FIG. 31 is a side elevational view illustrating the manner in which a jig and the outer edge of a bearing flange of a mount are held in contact with each other in a position calculating operation for calculating the position of the central axis of the mount of a processing apparatus according to a third modification of the second embodiment.

A processing apparatus according to a third modification of the second embodiment will hereinafter be described below with reference to the drawings. FIG. 31 illustrates in side elevation the manner in which a jig and the outer edge of a bearing flange of a mount are held in contact with each other in a position calculating operation for calculating the position of the central axis of the mount of the processing apparatus according to the third modification of the second embodiment. In FIG. 31, those parts of the processing apparatus according to the third modification which are identical to those of the processing apparatus according to the second embodiment are denoted by identical reference characters, and will not be described in detail below.

The processing apparatus, denoted by 1, according to the third modification of the second embodiment is the same as the processing apparatus 1 according to the first embodiment except that in the position calculating operation for calculating the position of the central axis 246 of the mount 24 in the position calculating operation for calculating the position of the mount 24, the processing apparatus 1 controls the moving unit 84 to move the mount 24 and the blade chuck 82 relatively to each other in the X-axis direction and the Z-axis direction to bring the outer edge of the bearing flange 243 of the mount 24 and the jig 300 into contact with each other at at least three contact points, and calculates the position in the X-axis direction and the position in the Z-axis direction of the central axis 246 of the mount 24 from the position in the X-axis direction as represented by the X coordinate and the position in the Z-axis direction as represented by the Z coordinate detected by the position detecting units at the time the output signals from the vibration detecting sensors 28 exceed the threshold value 400 as they detect vibrations upon contact between the outer edge of the bearing flange 243 and the jig 300.

In the processing apparatus 1 according to the third modification of the second embodiment, as with the second embodiment, the mount 24 of the spindle 23 has the vibration detecting sensors 28, and the processing apparatus 1 brings the jig 300 into contact with the bearing flange 243 of the mount 24, and grasps the position where the bearing flange 243 and the jig 300 contact each other on the basis of the output signals from the vibration detecting sensors 28 and the detection signals from the position detecting units. As a result, the processing apparatus 1 according to the third modification of the second embodiment, as with the first embodiment, is able to determine with ease the position of the mount 24 on which a cutting blade 21 is mounted.

According to the present invention, in the second embodiment, each of the blade chucks 82 may include a vibration detecting sensor 28 as with the first embodiment.

[Modification]

Figure 32:
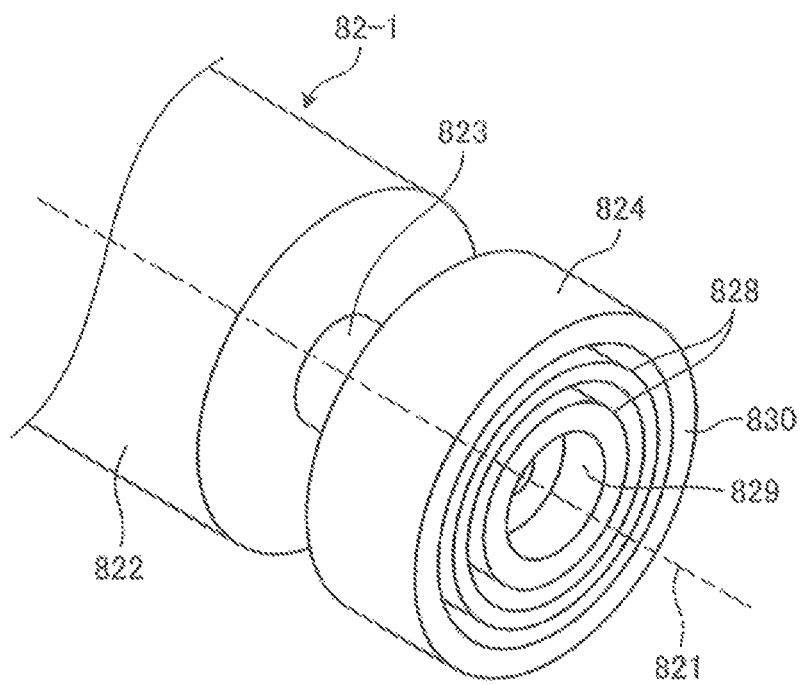
FIG. 32 is a perspective view illustrating by way of example of the structure of a blade chuck of a blade mounting/dismounting unit of a blade changer unit of a processing apparatus according to a modification of the first and second embodiments.

A processing apparatus according to a modification of the first embodiment and the second embodiment will hereinafter be described below with reference to the drawings. FIG. 32 illustrates in perspective by way of example the structure of a blade chuck of a blade mounting/dismounting unit of a blade changer unit of the processing apparatus according to the modification of the first embodiment and the second embodiment. In FIG. 32, those parts of the processing apparatus according to the modification which are identical to those of the processing apparatus according to the first embodiment and the second embodiment are denoted by identical reference characters, and will not be described in detail below.

The processing apparatus, denoted by 1, according to the modification is the same as the processing apparatus according to the first embodiment and the second embodiment except that the blade chuck 82 is of a different structure. As illustrated in FIG. 32, the blade chuck, denoted by 82-1, of the blade mounting/dismounting unit 80 of the blade changer unit 7 of the processing apparatus 1 according to the modification includes a support base 824 that has a distal end face 830 facing the blade holder 74 and the mount 24 of the cutting unit 20 and having two suction grooves 828 defined therein that are connected to a suction source and an entry hole 829 defined therein for receiving the boss 242 that enters the entry hole 829 when a cutting blade 21 is mounted on and dismounted from the cutting unit 20. The suction grooves 828 and the entry hole 829 are recessed from the distal end face 830.

According to the modification, the two suction grooves 828 are of an annular shape and positioned coaxially with the end face 830 of the support base 824. When a negative pressure from the suction source acts in the suction grooves 828, the cutting blade 21 is held under suction on the distal end face 830 of the support base 824. The entry hole 829 is defined centrally in the distal end face 830 of the support base 824 coaxially therewith.

In the processing apparatus 1 according to the modification, the mount 24 of the spindle 23 has the vibration detecting sensors 28 or the blade chuck 82 has the vibration detecting sensor 28, and the processing apparatus 1 grasps the position where the blade chuck 82, the jig 300, or the cutting blade 21 and the mount 24 contact each other on the basis of the output signals from the vibration detecting sensors 28 and the detection signals from the position detecting units. As a result, the processing apparatus 1 according to the modification, as with the first embodiment and the second embodiment, is able to determine with ease the position of the mount 24 on which a cutting blade 21 is mounted.

Third Embodiment

Figure 33:
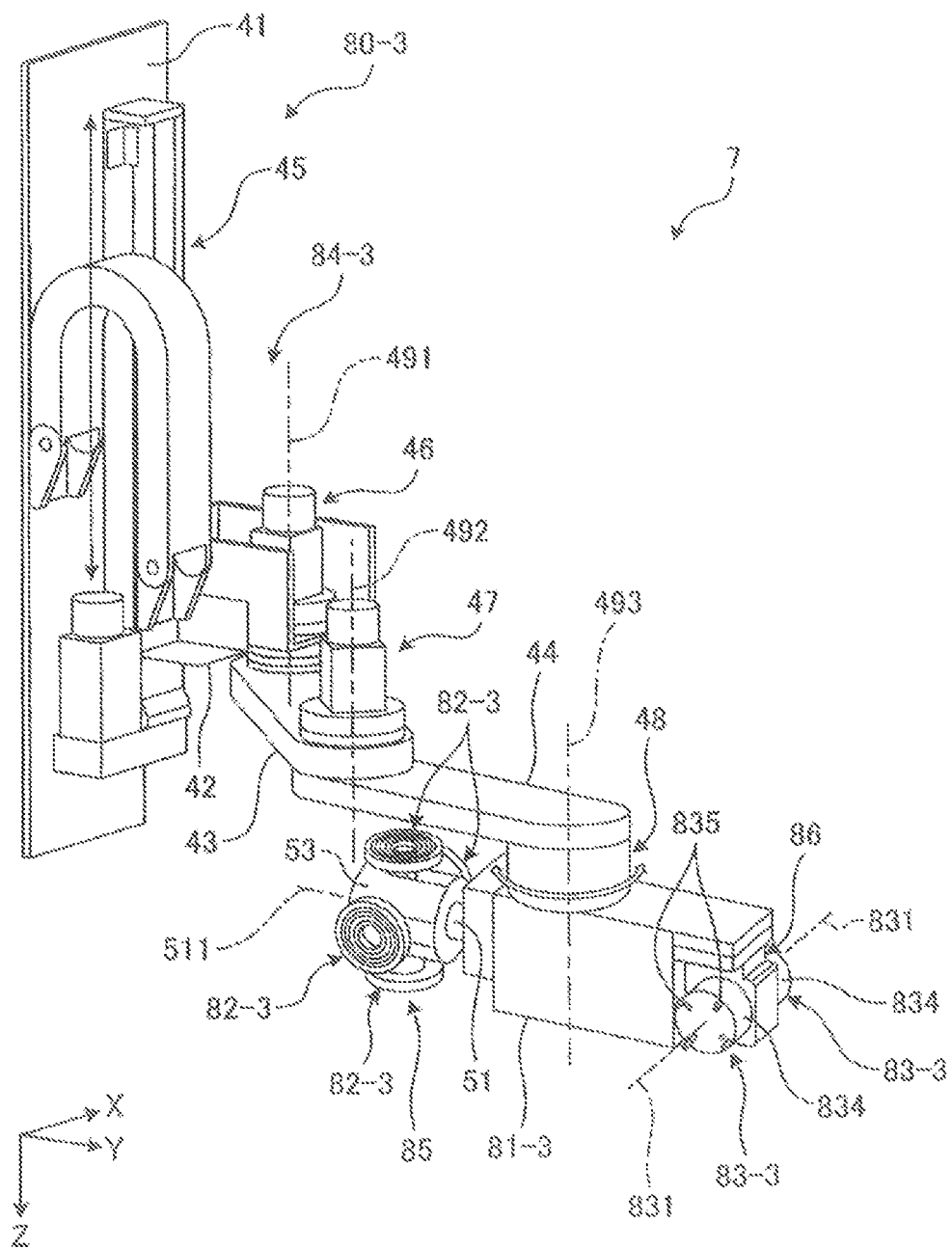
FIG. 33 is a perspective view illustrating by way of example of the structure of a blade mounting/dismounting unit of a blade changer unit of a processing apparatus according to a third embodiment of the present invention.
Figure 34:
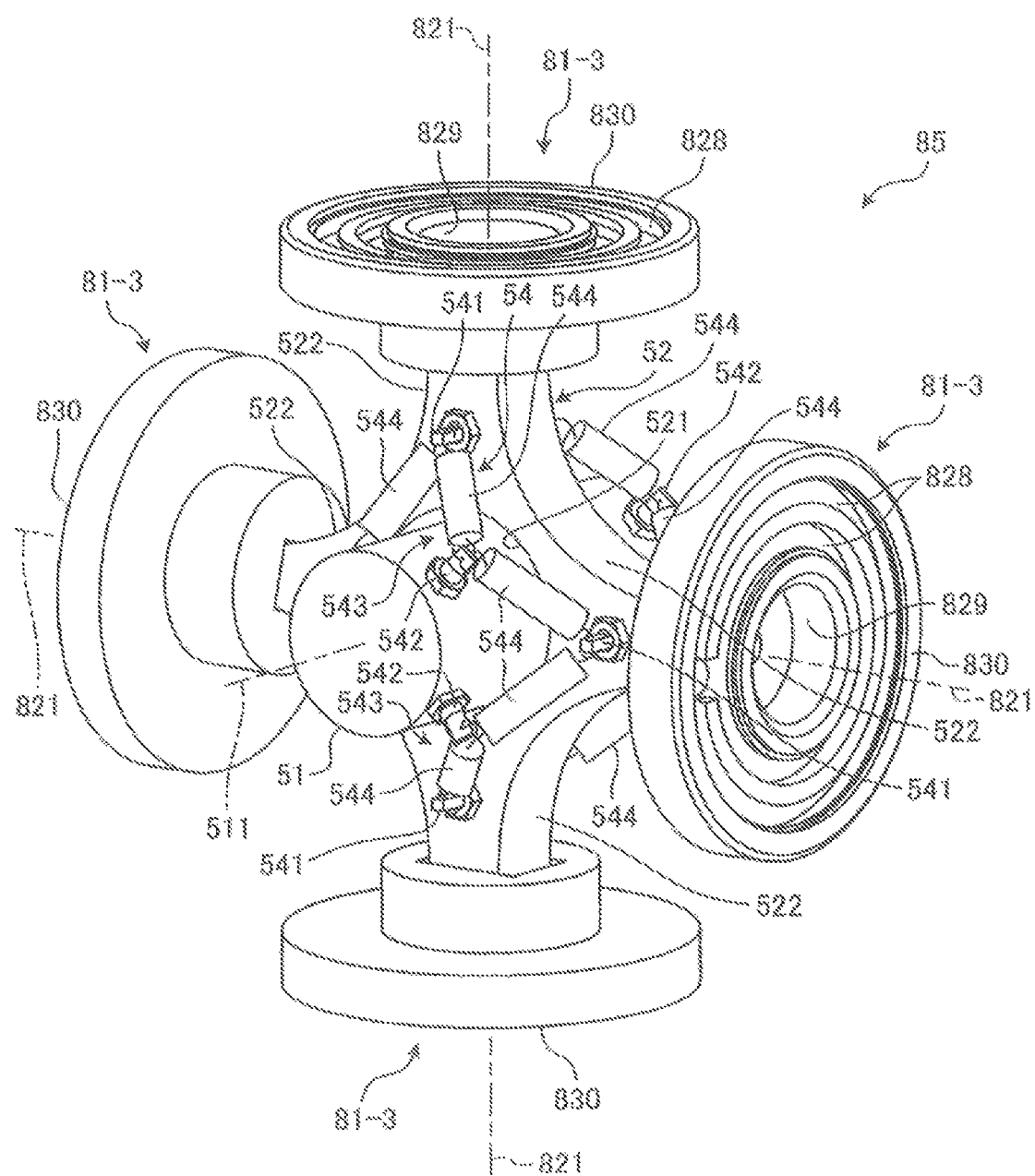
FIG. 34 is a perspective view of a blade holding unit of the blade mounting/dismounting unit illustrated in FIG. 33.
Figure 35:
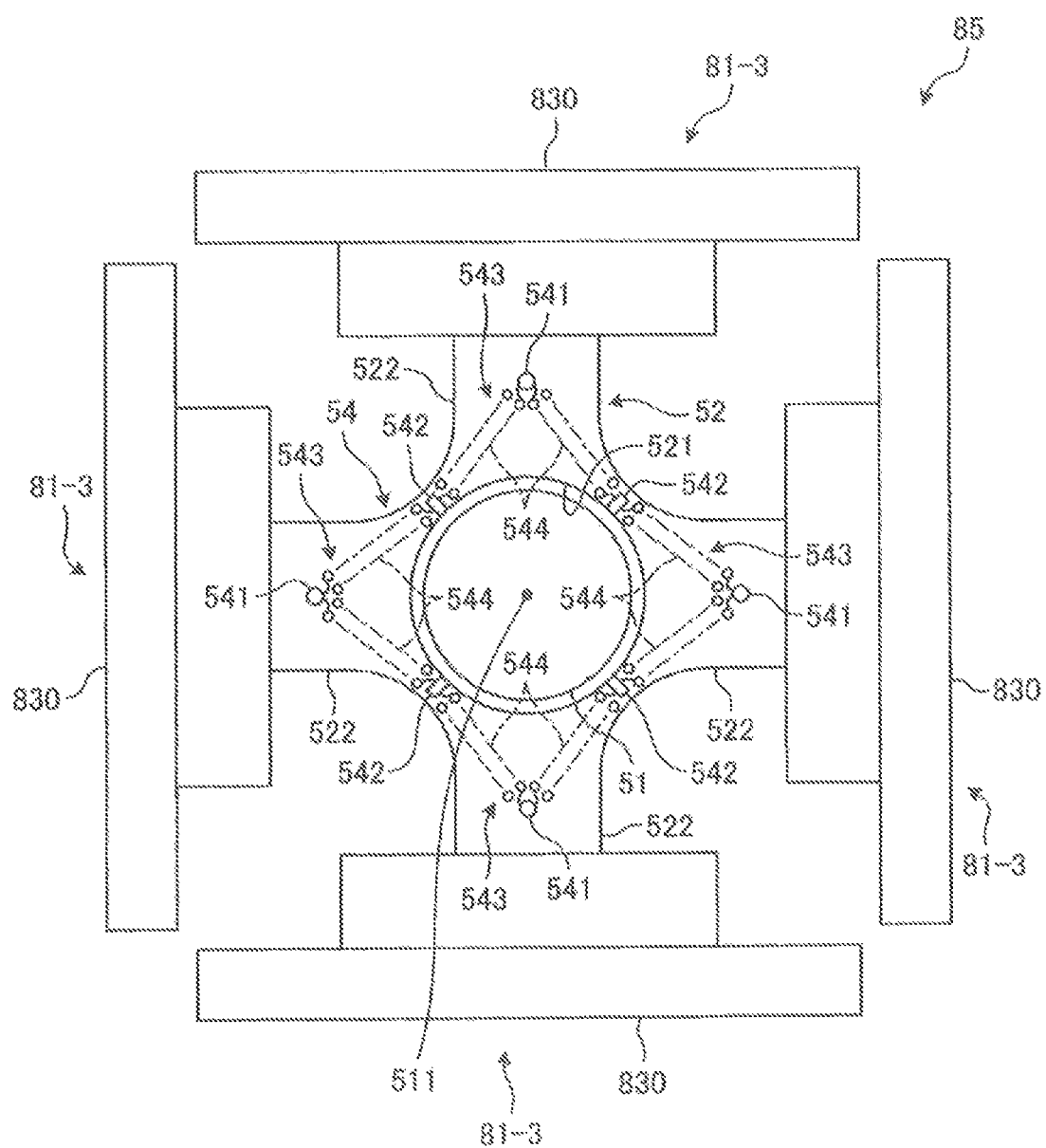
FIG. 35 is a front elevational view of the blade holding unit illustrated in FIG. 34.

A processing apparatus according to a third embodiment of the present invention will be described below with reference to the drawings. FIG. 33 illustrates in perspective by way of example the structure of a blade mounting/dismounting unit of a blade changer unit of the processing apparatus according to the third embodiment. FIG. 34 illustrates in perspective a blade holding unit of the blade mounting/dismounting unit illustrated in FIG. 33. FIG. 35 illustrates in front elevation the blade holding unit illustrated in FIG. 34. In FIGS. 33, 34, and 35, those parts that are identical to those according to the first embodiment and the second embodiment are denoted by identical reference characters and will not be described in detail below.

The processing apparatus, denoted by 1, according to the third embodiment is the same as the processing apparatus according to the first embodiment and the second embodiment except that the blade mounting/dismounting unit, denoted by 80-3, is structurally different from the blade mounting/dismounting unit according to the first embodiment and the second embodiment. According to the third embodiment, the processing apparatus 1 includes only one blade mounting/dismounting unit 80-3 illustrated in FIG. 33.

As illustrated in FIG. 33, the blade mounting/dismounting unit 80-3 of the processing apparatus 1 according to the third embodiment includes a unit body 81-3, a moving unit 84-3 as a moving member on which the unit body 81-3 is movably supported, a blade holding unit 85, and a nut holding unit 86. The unit body 81-3 is shaped as a rectangular parallelepiped whose longitudinal directions are parallel to horizontal directions, supporting the blade holding unit 85 on one end thereof and the nut holding unit 86 on the other end thereof.

The moving unit 84-3 moves the unit body 81-3, i.e., blade chucks 82-3 of the blade holding unit 85 and nut holders 83-3 of the nut holding unit 86, along X-axis directions, Y-axis directions, and Z-axis directions. The moving unit 84-3 also moves the blade chucks 82-3 of the blade holding unit 85 between a position where they can mount a cutting blade 21 on and dismount a cutting blade 21 from the blade holder 74 in the transfer position 744 of the blade stocker 70 and a position where they can mount a cutting blade 21 on and dismount a cutting blade 21 from the boss 242 of the mount 24 of the cutting unit 20 in the mounting/dismounting position. The moving unit 84-3 also moves the blade chucks 82-3 of the blade holding unit 85 to a position where they can mount the fastening nut 27 on and dismount the fastening nut 27 from the boss 242 of the mount 24 of the cutting unit 20 in the mounting/dismounting position.

According to the third embodiment, the moving unit 84-3 includes a base 41 fixed to the apparatus body 2, etc., a vertically movable member 42, a first rotary arm 43, a second rotary arm 44, a vertically moving mechanism 45, a first rotating mechanism 46, a second rotating mechanism 47, and a third rotating mechanism 48. The base 41 is of a straight shape parallel to the Z-axis directions. According to the third embodiment, the base 41 extends upwardly from an upper surface of the apparatus body 2. The vertically movable member 42 is movably mounted on the base 41 for movement in the Z-axis directions.

The first rotary arm 43 and the second rotary arm 44 extend in a straight shape. The first rotary arm 43 has an end rotatably supported on the vertically movable member 42 for rotation about a first rotational axis 491 parallel to the Z-axis directions. The other end of the first rotary arm 43 and an end of the second rotary arm 44 are rotatably supported on each other for rotation about a second rotational axis 492 parallel to the Z-axis directions. The unit body 81-3 has its central portion rotatably supported on the other end of the second rotary arm 44 for rotation about a third rotational axis 493 parallel to the Z-axis directions.

The vertically moving mechanism 45 moves the vertically movable member 42 in the Z-axis directions with respect to the base 41. The first rotating mechanism 46 rotates the end of the first rotary arm 43 about the first rotational axis 491 with respect to the vertically movable member 42. The second rotating mechanism 47 rotates the other end of the first rotary arm 43 and the end of the second rotary arm 44 about the second rotational axis 492 with respect to each other. The third rotating mechanism 48 rotates the unit body 81-3 about the third rotational axis 493 with respect to the other end of the second rotary arm 44.

The blade holding unit 85 includes a rotational shaft 51 supported on a longitudinal end of the unit body 81-3 illustrated in FIGS. 34 and 35, a support member 52, a hollow cylindrical cover member 53 illustrated in FIG. 33 covering most of the rotational shaft 51 and the support member 52, and a plurality of blade chucks 82-3 as holders for holding cutting blades 21. The rotational shaft 51 is of a cylindrical shape having a central axis 511 parallel to horizontal directions and can be rotated about the central axis 511 by an electric motor, not illustrated.

The support member 52 has a through hole 521 defined centrally therein through which the rotational shaft 51 extends, and includes a plurality of radially outward extensions 522 extending radially outwardly from the center of the support member 52. The through hole 521 has an inside diameter larger than the outside diameter of the rotational shaft 51. According to the third embodiment, the support member 52 has four outward extensions 522. According to the present invention, however, the support member 52 may have at least two outward extensions 522. The outward extensions 522 are disposed at circumferentially spaced intervals. According to the third embodiment, the outward extensions 522 are disposed at circumferentially equally spaced intervals.

The support member 52 is coupled by a joint assembly 54 to the rotational shaft 51 that extends through the through hole 521. The joint assembly 54 includes extension fittings 541 disposed on the outward extensions 522, shaft fittings 542 disposed on an outer circumferential surface of the rotational shaft 51, and resilient member pairs 543 associated respectively with the extension fittings 541. The extension fittings 541 protrude from the respective centers in widthwise and lengthwise directions of the axially opposite surfaces of the outward extensions 522. In other words, two extension fittings 541 are disposed on each of the outward extensions 522, so that the joint assembly 54 has a total of eight extension fittings 541 according to the third embodiment.

The shaft fittings 542 protrude from the outer circumferential surface of the rotational shaft 51 in as many as the number of the extension fittings 541. According to the third embodiment, specifically, the joint assembly 54 has a total of eight shaft fittings 542. Of the shaft fittings 542, one half, i.e., four shaft fittings 542, are disposed at circumferentially equally spaced intervals on the outer circumferential surface of the rotational shaft 51 on one axial side of the support member 52. The remaining four shaft fittings 542 are disposed at circumferentially equally spaced intervals on the outer circumferential surface of the rotational shaft 51 on the other axial side of the support member 52. With the rotational shaft 51 extending through the through hole 521, according to the third embodiment, the four shaft fittings 542 on one axial side of the support member 52 and the other four shaft fittings 542 on the other axial side of the support member 52 are spaced from each other along the central axis 511 across the support member 52.

The resilient member pairs 543 are available in as many as the number of extension fittings 541 and the number of shaft fittings 542. In other words, the joint assembly 54 has a total of eight resilient member pairs 543. Each of the resilient member pairs 543 includes a pair of helical springs 544 as resilient members. According to the third embodiment, the helical springs 544 are used as the resilient members. According to the present invention, however, the resilient members are not limited to the helical springs 544. The helical springs 544 of each of the resilient member pairs 543 have ends joined to a corresponding one of the extension fittings 541 and other ends joined to adjacent two, that are closet to each other and circumferentially next to each other, of the shaft fittings 542 on the rotational shaft 51 extending through the through hole 521. Therefore, two helical springs 544 have ends joined to each of the extension fittings 541, and two helical springs 544 have other ends joined to each of the shaft fittings 542.

Each of the helical springs 544 normally urges the extension fitting 541 and the shaft fitting 542 to which it is joined to move toward each other. According to the third embodiment, all of the helical springs 544 have equal urging forces. As described above, the outward extensions 522 are disposed at circumferentially spaced intervals, the extension fittings 541 are disposed on the axially opposite surfaces of the outward extensions 522, one half of the shaft fittings 542 on one side of the support member 52 and the remaining half of the shaft fittings 542 on the other side of the support member 52 are axially spaced from each other along the central axis 511, and the helical springs 544 of each of the resilient member pairs 543 have ends joined to a corresponding one of the extension fittings 541 and other ends joined to adjacent two, that are closet to each other and circumferentially next to each other, of the shaft fittings 542 on the rotational shaft 51 extending through the through hole 521. Consequently, the joint assembly 54 normally urges the rotational shaft 51 and the support member 52 under the urging forces of the helical springs 544 to make the rotational shaft 51 and the through hole 521 coaxial with each other and make the directions in which the outward extensions 522 extend perpendicular to the central axis 511. The joint assembly 54 keeps the rotational shaft 51 and the support member 52 in relative positions where the rotational shaft 51 and the through hole 521 are coaxial with each other and the directions in which the outward extensions 522 extend are perpendicular to the central axis 511.

The blade chucks 82-3 are mounted on respective radially outward distal ends of the outward extensions 522. The blade mounting/dismounting unit 80-3 according to the third embodiment has four blade chucks 82-3. Each of the blade chucks 82-3 includes a support base 824 mounted on one of the radially outward distal ends of the outward extensions 522, suction grooves 828 connected to a suction source that are defined in a distal end face 830 of the support base 824 that faces the blade holder 74 and the mount 24 of the cutting blade 21, and an entry hole 829 defined in the support base 824 for receiving the boss 242 that enters the entry hole 829 when the cutting blade 21 is mounted on and dismounted from the cutting unit 20, as with the modification of the first embodiment and the second embodiment. Each of the blade chucks 82-3 holds a cutting blade 21 or a jig 300 under suction on the distal end face 830 because of a negative pressure acting in the suction grooves 828 from the suction source. According to the third embodiment, each of the blade chucks 82-3 holds a cutting blade 21 or a jig 300 under suction. According to the present invention, however, a cutting blade 21 or a jig 300 may be held on each of the blade chucks 82-3 by any other means than the suction means.

According to the third embodiment, the distal end faces 830 of those blade chucks 82-3 that are disposed adjacent to each other in circumferential directions around the rotational shaft 51 lie perpendicularly to each other, and the distal end faces 830 of those blade chucks 82-3 that opposite each other across the rotational shaft 51 lie parallel to each other.

Furthermore, since the support member 52 and the rotational shaft 51 are joined to each other by the joint assembly 54, the distal end faces 830 of the blade chucks 82-3 are swingably joined to the rotational shaft 51 by the joint assembly 54 that has the helical springs 544.

With the support member 52 and the rotational shaft 51 being joined to each other by the joint assembly 54, the angles formed between adjacent ones of lines interconnecting the central axes 821 of the blade chucks 82-3 and the central axis 511 of the rotational shaft 51 are equal to each other. According to the third embodiment, each of the angles is of 90 degrees. Therefore, with the support member 52 and the rotational shaft 51 being joined to each other by the joint assembly 54, the blade chucks 82-3 are disposed in respective positions spaced at angular intervals of 90 degrees around the central axis 511 of the rotational shaft 51.

The nut holding unit 86 is supported on the other longitudinal end of the unit body 81-3, and has two nut holders 83-3. According to the third embodiment, the nut holding unit 86 has respective central axes 831 extending in line with each other and parallel to horizontal directions, and also have respective support bases 834, each including a plurality of grippers 835, disposed in respective positions in which the grippers 835 of the support bases 834 face away from each other.

For changing the cutting blade 21 on each of the cutting units 20 with the blade changer unit 7 according to the third embodiment, the moving unit 84-3 brings the blade chucks 82-3 of the blade holding unit 85 supported on the unit body 81-3 into facing relation to the blade holder 74 in the transfer position 744 of the blade stocker 70 and the boss 242 of the mount 24 of the cutting unit 20 in the mounting/dismounting position, and brings the nut holder 83-3 of the nut holding unit 86 supported on the unit body 81-3 into facing relation to the boss 242 of the mount 24 of the cutting unit 20 in the mounting/dismounting position.

For calculating the positions referred above of the mounts 24 of the cutting units 20 with the blade changer unit 7 according to the third embodiment, either one of the blade chucks 82-3 of the blade holding unit 85 holds a cutting blade 21 or a jig 300 under suction, and the moving unit 84-3 moves either one of the blade chucks 82-3 of the blade holding unit 85 supported on the unit body 81-3 in the same manner as the second embodiment.

In the processing apparatus 1 according to the third embodiment, the mount 24 of the spindle 23 has the vibration detecting sensors 28, and the processing apparatus 1 grasps the positions where the cutting blade 21 or the jig 30 and the mount 24 contact each other on the basis of the output signals from the vibration detecting sensors 28 and the detection results from the position detecting units. As a result, the processing apparatus 1 according to the third embodiment is able to determine with ease the position of the mount 24 on which a cutting blade 21 is mounted, as with the first embodiment.

According to the present invention, in the third embodiment, each of the blade chucks 82-3 may include a vibration detecting sensor 28 as with the first embodiment.

[Modification]

Figure 36:
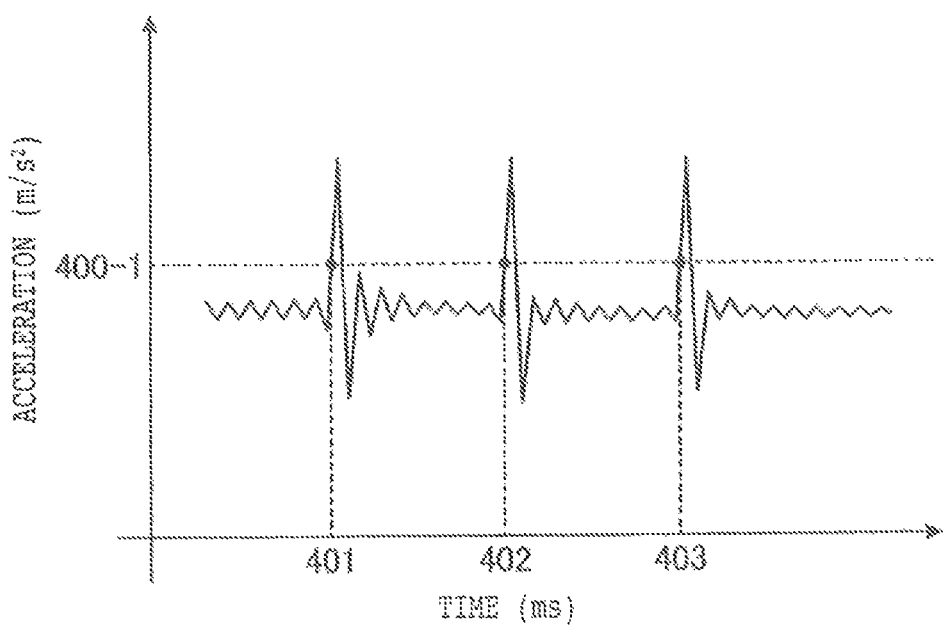
FIG. 36 is a diagram illustrating accelerations detected by a vibration detecting sensor of a processing apparatus according to a modification of the first through third embodiments.

A processing apparatus according to a modification of the first embodiment, the second embodiment, and the third embodiment will be described below with reference to the drawings. FIG. 36 illustrates accelerations detected by a vibration detecting sensor of the processing apparatus according to the modification of the first embodiment, the second embodiment, and the third embodiment. In FIG. 36, those parts which are identical to those of the processing apparatus according to the first embodiment, the second embodiment, and the third embodiment are denoted by identical reference characters, and will not be described in detail below.

The processing apparatus, denoted by 1, according to the modification of the first embodiment, the second embodiment, and the third embodiment is the same as the processing apparatus according to the first embodiment, the second embodiment, and the third embodiment except that the vibration detecting sensors 28 for detecting vibrations are acceleration sensors for detecting accelerations as illustrated in FIG. 36.

In the processing apparatus 1 according to the modification of the first embodiment, the second embodiment, and the third embodiment, the mount 24 or the blade chucks 82-1 and 82-3 have vibration detecting sensors 28. The vibration detecting sensors 28 detect the accelerations of vibrations propagated through the spindle 23 and the mount 24 of the cutting unit 20, and output signals representing the detected accelerations to the control unit 100. In FIG. 36, the horizontal axis represents time elapsed after the position calculating operation for calculating the position of the central axis 246 of the mount 24 has started, and the vertical axis represents the accelerations represented by the output signals from the vibration detecting sensors 28.

In the processing apparatus 1 according to the modification of the first embodiment, the second embodiment, and the third embodiment, the vibration detecting sensors 28 detect the accelerations of vibrations caused when the grippers 825 of the blade chuck 82, the jig 300, or the cutting blade 21 contact the mount 24 of the cutting unit 20 in the mounting/dismounting position. When the accelerations represented by the output signals from the vibration detecting sensors 28 exceed a threshold value 400-1 illustrated in FIG. 36, the processing apparatus 1 can detect the position in the X-axis direction and the position in the Z-axis direction of the central axis 246 of the mount 24 of the cutting unit 20 in the mounting/dismounting position and the position in the Y-axis direction of the distal end face 247 of the boss 242 of the mount 24. The threshold value 400-1 is a value lower than the accelerations represented by the signals from the vibration detecting sensors 28 at the time they detect the accelerations of vibrations caused when the grippers 825 of the blade chuck 82, the jig 300, or the cutting blade 21 contact the mount 24.

In the processing apparatus 1 according to the modification, the mount 24 of the spindle 23 has the vibration detecting sensors 28, and the processing apparatus 1 grasps the positions where the grippers 825 of the blade chuck 82, the jig 300, or the cutting blade 21 and the mount 24 contact each other on the basis of the output signals from the vibration detecting sensors 28 and the detection results from the position detecting units. As a result, the processing apparatus 1 according to the modification is able to determine with ease the position of the mount 24 on which a cutting blade 21 is mounted, as with the first embodiment. In the processing apparatus 1 according to the modification, the blade chucks 82, 82-1, and 82-3 may have vibration detecting sensors 28.

The present invention is not limited to the above embodiments and modifications. Various changes and modifications may be made therein without departing from the scope of the invention. According to the above embodiments, the position in the Y-axis direction of the distal end face 247 of the boss 242 of the mount 24 is detected. According to the present invention, the position in the Y-axis direction of the distal end face 247 of the boss 242 of the mount 24 may not be detected.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:
   a holding table for holding a workpiece thereon, the holding table being processing-feedable in an X-axis direction relatively to a spindle;
   a cutting unit including the spindle and a mount fixed to a distal end of the spindle and having a boss extending in a Y-axis direction perpendicular to the X-axis direction;
   a blade changer unit for mounting a cutting blade on the boss of the mount and dismounting a cutting blade from the boss of the mount; and
   a controller for controlling the cutting unit and the blade changer unit, wherein
   the mount further includes a bearing flange for supporting the cutting blade, the bearing flange projecting radially from an axial rear end of the boss,
   the blade changer unit includes
      a holder for holding the cutting blade, and
      a moving unit for moving the holder,
   one or both of the cutting unit and the blade changer unit have a vibration detecting sensor for detecting vibrations, and
   the controller includes
      a calculator for moving the boss or the bearing flange and the holder relatively to each other in the X-axis direction and a Z-axis direction perpendicular to the X-axis direction and the Y-axis direction to bring the boss or the bearing flange and the holder into contact with each other at at least three contact points, and calculating a center of the mount from an X coordinate and a Z coordinate where the vibration detecting sensor detects vibrations caused upon the contact between the boss or the bearing flange and the holder, and
      a mounting/dismounting controller for aligning a center of the holder with the center of the mount calculated by the calculator and mounting the cutting blade on the boss or dismounting the cutting blade from the boss.

2. The processing apparatus according to claim 1, wherein
the spindle has a central axis whose direction is represented by the Y-axis direction,
the controller brings the holder into contact with the boss or a distal end of the bearing flange,
the calculator calculates a coordinate in the Y-axis direction of the boss from a Y coordinate where the vibration detecting sensor detects vibrations, and
the mounting/dismounting controller mounts the cutting blade on the boss or dismounts the cutting blade from the boss while in alignment with the coordinate in the Y-axis direction of the boss that is calculated by the calculator.

3. The processing apparatus according to claim 2, wherein the vibration detecting sensor includes either an acoustic emission sensor or an acceleration sensor.

4. The processing apparatus according to claim 1, wherein the vibration detecting sensor includes either an acoustic emission sensor or an acceleration sensor.

5. A processing apparatus comprising:
a holding table for holding a workpiece thereon, the holding table being processing-feedable in an X-axis direction relatively to a spindle;
a cutting unit including the spindle and a mount fixed to a distal end of the spindle and having a boss extending in a Y-axis direction perpendicular to the X-axis direction;
a blade changer unit for mounting a cutting blade on the boss of the mount and dismounting a cutting blade from the boss of the mount; and
a controller for controlling the cutting unit and the blade changer unit, wherein
the mount further includes a bearing flange for supporting the cutting blade, the bearing flange projecting radially from an axial rear end of the boss,
the blade changer unit includes
a holder for holding a jig having an opening defined therein that is larger than the boss, and
a moving unit for moving the holder,
one or both of the cutting unit and the blade changer unit have a vibration detecting sensor for detecting vibrations, and
the controller includes,
a calculator for moving the boss or the bearing flange and the jig relatively to each other in the X-axis direction and a Z-axis direction perpendicular to the X-axis direction and the Y-axis direction to bring the boss or the bearing flange and the jig into contact with each other at at least three contact points, and calculating a center of the mount from an X coordinate and a Z coordinate where the vibration detecting sensor detects vibrations caused upon the contact between the boss or the bearing flange and the jig, and
a mounting/dismounting controller for aligning a center of the holder with the center of the mount calculated by the calculator and mounting the cutting blade on the boss or dismounting the cutting blade from the boss.

6. The processing apparatus according to claim 5, wherein the jig includes the cutting blade.

7. The processing apparatus according to claim 6, wherein the vibration detecting sensor includes either an acoustic emission sensor or an acceleration sensor.

8. The processing apparatus according to claim 5, wherein the spindle has a central axis whose direction is represented by the Y-axis direction,
the controller brings the jig into contact with the boss or a distal end of the bearing flange,
the calculator calculates a coordinate in the Y-axis direction of the boss from a Y coordinate where the vibration detecting sensor detects vibrations, and
the mounting/dismounting controller mounts the cutting blade on the boss or dismounts the cutting blade from the boss while in alignment with the coordinate in the Y-axis direction of the boss that is calculated by the calculator.

9. The processing apparatus according to claim 8, wherein the vibration detecting sensor includes either an acoustic emission sensor or an acceleration sensor.

10. The processing apparatus according to claim 5, wherein the vibration detecting sensor includes either an acoustic emission sensor or an acceleration sensor.

* * * * *